US011022681B2

(12) United States Patent
Caporizzo

(10) Patent No.: US 11,022,681 B2
(45) Date of Patent: Jun. 1, 2021

(54) SYSTEM AND METHOD FOR MEASURING AND RENDERING TERRAIN ON A DISPLAY

(71) Applicant: Louis Caporizzo, North Wales, PA (US)

(72) Inventor: Louis Caporizzo, North Wales, PA (US)

(73) Assignee: OKKOLA TECHNOLOGIES, LLC, North Wales, PA (US)

(*) Notice: Subject to any disclaimer, the term of this patent is extended or adjusted under 35 U.S.C. 154(b) by 611 days.

(21) Appl. No.: 15/849,357

(22) Filed: Dec. 20, 2017

(65) Prior Publication Data
US 2018/0136322 A1 May 17, 2018

Related U.S. Application Data

(63) Continuation-in-part of application No. 14/270,632, filed on May 6, 2014, now Pat. No. 9,851,434.

(51) Int. Cl.
| G01C 21/00 | (2006.01) |
| G01S 7/497 | (2006.01) |
| G01S 17/89 | (2020.01) |
| G01S 17/42 | (2006.01) |
| G01S 17/08 | (2006.01) |
| G01S 7/00 | (2006.01) |
| G01S 17/87 | (2020.01) |
| G01S 17/931 | (2020.01) |
| G01C 21/20 | (2006.01) |

(52) U.S. Cl.
CPC .............. *G01S 7/497* (2013.01); *G01S 7/003* (2013.01); *G01S 17/08* (2013.01); *G01S 17/42* (2013.01); *G01S 17/87* (2013.01); *G01S 17/89* (2013.01); *G01S 17/931* (2020.01); *G01C 21/20* (2013.01)

(58) Field of Classification Search
CPC ........ G01S 17/87; G01S 17/931; G01S 17/89; G01S 17/42; G01S 7/003; G01S 7/497; G01C 21/20
USPC ......................................................... 701/400
See application file for complete search history.

(56) References Cited

U.S. PATENT DOCUMENTS

| 3,654,477 A | 4/1972 | Benjamin, Jr. |
| 6,198,395 B1 | 3/2001 | Sussman |
| 7,363,157 B1* | 4/2008 | Hanna .................... G01C 11/00 702/5 |
| 7,620,493 B2 | 11/2009 | Stankiewicz et al. |
| 7,855,657 B2 | 12/2010 | Doemens et al. |
| 8,068,644 B2 | 11/2011 | Tkacik |

(Continued)

*Primary Examiner* — Mark Hellner
(74) *Attorney, Agent, or Firm* — Volpe Koenig

(57) ABSTRACT

A system and method for rendering terrain on a display is disclosed. The system and method include a computer-implemented distance measuring system integrated in a drone to enable scanning of a terrain. The scanning may be performed from a given height. This results in the levels of the terrain which may then be rendered using a color scale. The rendering identifying the different levels may be superimposed over an image of the terrain, such as on a display, for example. By so doing, the superimposed terrain with the rendering provides the viewer of the display an enhanced view of the terrain. The system and method may be utilized when the viewer is watching the display, such as when watching golf and a player is about to putt on the putting green. The rendering may be removed once the putt is initiated.

19 Claims, 9 Drawing Sheets

(56) References Cited

U.S. PATENT DOCUMENTS

| | | | | |
|---|---|---|---|---|
| 8,449,409 B1* | 5/2013 | Barkley | ............... | G01S 17/86 |
| | | | | 473/404 |
| 9,162,061 B2 | 10/2015 | Barnes | | |
| 9,488,833 B2 | 11/2016 | Cervantes | | |
| 2004/0141170 A1* | 7/2004 | Jamieson | ............ | G01S 7/483 |
| | | | | 356/5.01 |
| 2010/0090880 A1* | 4/2010 | Aiga | ............ | G01S 13/867 |
| | | | | 342/27 |
| 2016/0244187 A1* | 8/2016 | Byers | ............ | A47G 29/14 |
| 2017/0127606 A1* | 5/2017 | Horton | ............ | A01B 79/005 |

\* cited by examiner

SYSTEM AND METHOD FOR MEASURING AND RENDERING TERRAIN ON A DISPLAY

CROSS REFERENCE TO RELATED APPLICATION

This application is a continuation-in-part of U.S. patent application Ser. No. 14/270,632, filed 6 May 2014, entitled METHOD AND NAVIGATION SYSTEM FOR ASSISTING A VISUALLY IMPAIRED USER TO SAFELY WALK AROUND OBSTRUCTIONS AND IMPEDIMENTS with a sole inventor Louis Caporizzo, which is incorporated by reference as if fully set forth.

FIELD OF INVENTION

The present invention is directed to a system and method for rendering terrain on a display.

BACKGROUND

During a calendar year many golf tournaments are held throughout the world and most of the tournaments are shown on television for the entertainment of the viewers. In 2016, a total of 12.4 million television viewers in the United States watched the playing of the Masters. At times the home television viewer is not able to see the golf green's true terrain and may expect that the golf green contains no terrain abnormalities. Even though the terrain may be visualized in person at the event, the television viewer loses the ability to have a detailed view of the overall terrain, such as where embedded slopes are created to further challenge the players. During the putting process the golf ball may not travel in a straight line instead following a path dictated by the slopes and valleys on a green.

When a golf tournament is televised, the television camera is rarely positioned to transmit a clear view of the slopes that a player has to overcome in order to putt the ball in the hole. It is impractical for the television camera to show the rolling hills and valleys associated with green's turf. This information while not provided currently to the viewer, if provided, would enable the television viewer to understand the path or flight of the golf ball.

SUMMARY

A system and method for rendering terrain on a display is disclosed. The system and method include a computer-implemented distance measuring system integrated in a drone to enable scanning of a terrain. The scanning may be performed from a given height. This results in the levels of the terrain which may then be rendered using a color scale. The rendering identifying the different levels may be superimposed over an image of the terrain, such as on a display, for example. By so doing, the superimposed terrain with the rendering provides the viewer of the display an enhanced view of the terrain. The system and method may be utilized when the viewer is watching the display, such as when watching golf and a player is about to putt on the putting green. The rendering may be removed once the putt is initiated.

A computer implemented system mounted within the drone may have the ability to survey the terrain utilizing multiple computer controlled distance measuring devices. All of the collected distance measuring data points may be formatted and associated with a specific terrain level. The collected data points may be utilized to create a topographical map of the golf green or terrain of interest. The commands to the drone and to the distance measuring system may be provided by an operator and may be transmitted to the drone via radio frequency signals. The operator may have the ability to control and orient the drone to properly display the wanted field of view as requested by the television producers. The operator may guide and position the drone so that a view of the golf green is visible on the monitor, he may then have the ability to enter or select the dimensions of the wanted field of view that needs to be scanned. The collected data may be available to the operator computer and may be later transmitted to the TV producers so that it can be conditioned prior to superimposing it on a live video signal before it released for transmission. The topographical data can be collected and recorded and only to be utilized when needed. When a player is ready to putt on a green and the live picture may have the superimposed terrain levels, the resultant picture may give the home viewer an enhanced view which may show terrain abnormalities (slopes, valleys). The now transmitted TV picture is enhanced and may show previously unseen hidden details (slopes and valleys) that a golfer may have encountered during the putting process. The enhanced transmitted picture may provide an added level of appreciation especially when the green's terrain is made visible to the home TV viewer.

As part of the set up for the creation of said green map, multiple locators (stationary fixtures or perimeter outline) may be placed on the golf green in order to accurately match the created topographical map with the live camera shot. For example, the operator may drag a geometrical shape, such as a square or rectangle, for example, on the screen to best fit the area as outlined by the four markers.

During the initialization process the operator may place perimeter markers to outline the terrain to be mapped or he may turn to the drone's onboard camera and once the wanted terrain view is approved the operator could easily give the command of mapping the view on screen.

DETAILED DESCRIPTION

Figure 1A:
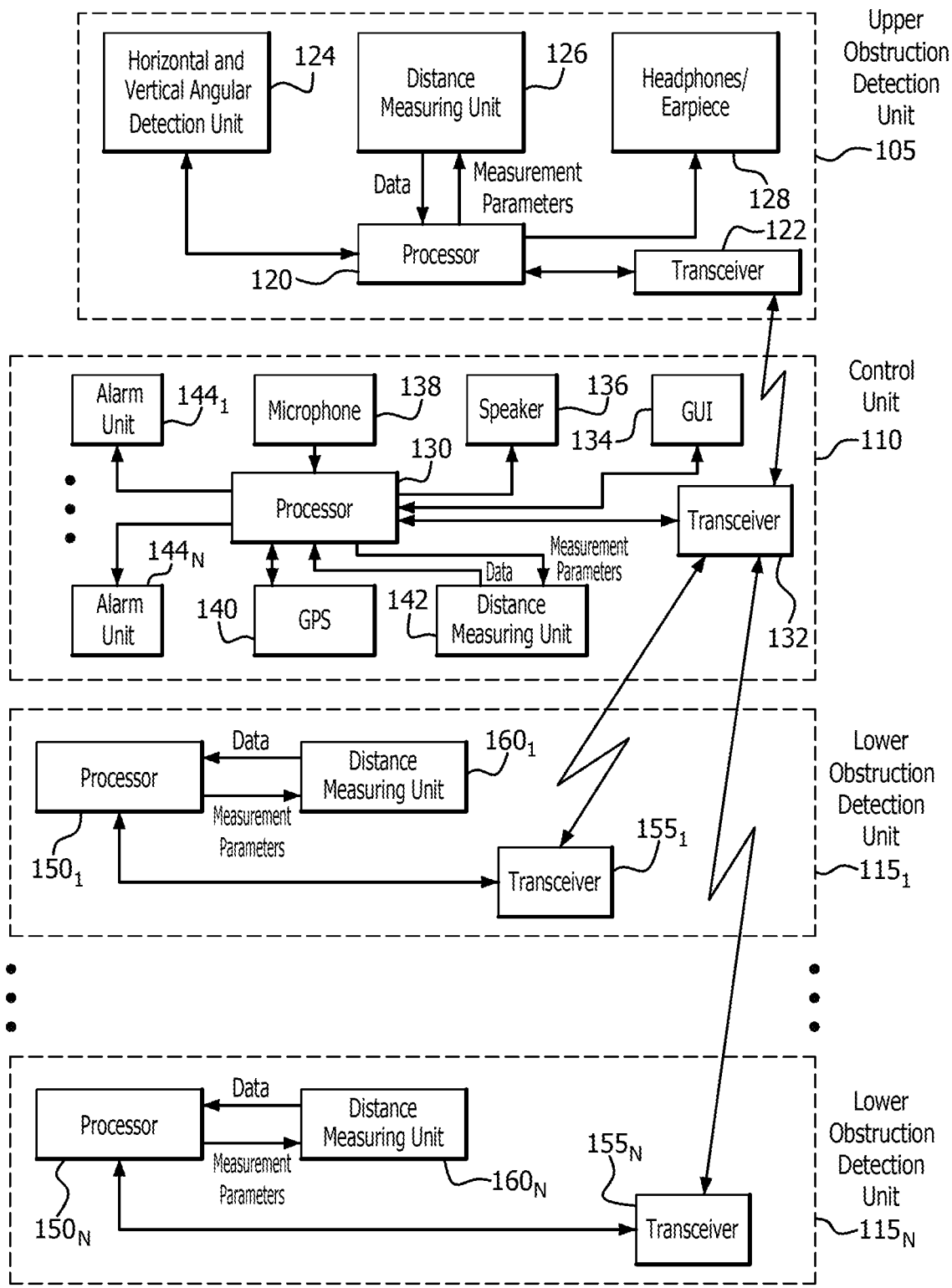
FIG. 1A is a block diagram of an example of a navigation system for a visually impaired user.

Today's computers, distance measuring technology and drone technology provide the building blocks to enhance the information provided to a television viewer. For example, views which substantiate the motion of a golf ball that was putted. By presenting terrain levels with each level highlighted in a specific shade of a selected color or colors provide a view that is missing in today's live television transmission of the sporting event. In order to provide this information, the terrain is mapped utilizing multiple distance measuring devices located at a selected height above the terrain. These devices may be included on a drone, for example.

The present invention is directed to the utilization of signals, such as by using lasers, to determine distances for creating topographical maps of a defined area, such as a terrain. Once the topographical maps of the area are determined, the system creates contour lines—sequentially connecting equal distance points—in either ascending or descending order from the longest or shortest measured distance from the measuring devices. The distance measurements may be combined and formatted to display a topographical map. This map may provide resolution at a level to identify terrain peaks and valleys. The degree of resolution may be increased or decreased by minimizing or maximizing the number of data points utilized for the mapping. The distance measurements may be used to present a topographical map of the terrain. The specifics of the map may be modified to fit the application of use, for example. The invention may be utilized in conjunction with live television sporting events to give the home television viewer an enhanced view of the terrain. The resultant topographical map may be superimposed on a live display of the event to provide a view to the home viewer with the view including the terrain map.

A method and apparatus are described for measuring distance points from the drone to the terrain in a systematic way in order to build a topographical map. Once measured a topographical map is created where each contour line is associated with an equal, or substantially, distance measurement from the drone. Pythagorean calculations may be used to determine the distance from the drone to a specific point on the terrain. Each distance is measured for each of the distance measuring selected firing angles (horizontal and vertical). The system may tabulate the distance measurements, processes the measurements, and generates the topographical map of the terrain including the highest point and lowest point of the mapped terrain. The map may be superimposed on a live picture whenever the mapped terrain is viewable within the picture that is transmitted. The mapped terrain plus the picture enhances the viewer experience. For example, the path that the golf ball travels is affected by the terrain.

The assemblies of the distance measuring detection system described herein may be secured on a drone. The drone may track its height and orientation, or may alternatively, maintain a constant height and fixed orientation during the mapping of the terrain. As part of initialization, the system may confirm that each of the assemblies have been correctly installed and are fully operational. The system may be configured to update the field of view either automatically based on the feed of the television picture, or by instruction, such as instructed by the operator or television producers utilizing a graphical user interface (GUI).

FIG. 1A shows a block diagram of an obstruction detection system 100 in accordance with one embodiment. The system 100 may include an upper obstruction detection unit 105, a control unit 110 and a plurality of lower obstruction detection units $115_1$-$115_N$. Each of these subassemblies of system 100 may include a distance measuring unit and may be secured on different parts of a visually impaired user's body so that obstacles may be detected while the user is walking without the user being injured. For example, the upper obstruction detection unit 105 may be positioned on the user's head, the control unit 110 may be positioned on the user's chest, and the lower obstruction detection units 115 may be positioned on the user's legs. Each of the subassemblies may be powered by a combination of one or more batteries, an auxiliary power source, or any other readily available power supply. Note that although only one upper obstruction detection unit 105, one control unit 110 and a plurality of lower obstruction detection units 115 are depicted in FIG. 1A, any number of obstruction detection units and control units may be used.

The system 100 may generate an alarm for the user if an object violates a minimum clearance distance in a defined field of view. The field of view may be determined by the user's physical size (e.g., height, length of arms) while the depth of the field may be created by a distance requested by the user that is to be monitored. The control unit 110 may be configured to define the scanned area to be monitored, and to compute and instruct a distance measuring unit in each of the subassemblies of system 100 as to its respective field of view to be monitored. The total field of view may be covered by original coordinates plus guard bands defined for each of the distance measuring units.

Each of the distance measuring units may have an adjustable laser light firing angle for a signal that is utilized for the measuring of distances to objects that may obstruct the user's path while walking. The laser light firing angle starting point may be defined by the control unit 110, but only after it receives inputs from the upper obstruction detection unit 105. The upper obstruction detection unit 105 may provide the starting laser light firing angle in both horizontal and vertical positions, reflecting the coordinates of the user's head position. The upper obstruction detection unit 105 may provide this firing angle starting data to the control unit 110, where it may be analyzed and processed so that it may instruct each distance measuring unit in the subassemblies of system 100 to cover a respective designated field of view for the user. In addition to providing the starting laser light firing angle coordinates, the upper obstruction detection unit 105 may monitor a portion of the field of view. If the user's head position changes during a data gathering cycle, the control unit 110 may wait until all of the data has been processed before moving to new coordinate settings. Once the new coordinates have been determined, the upper obstruction detection unit 105 may determine the size of the field to be monitored and provide the determined field size to the control unit 110. The total field calculations may be repeated every time the user's head changes its position from a previous position.

The distance measuring units may not be in sync with each other. Thus, each distance measuring unit may independently collect and report collected data to the control unit 110 for the specified field of view. The distance measuring units may be capable of adjusting their laser light firing angle when instructed by the control unit 110.

As shown in FIG. 1A, the upper obstruction detection unit 105 may include a processor 120, a transceiver 122, a horizontal and vertical angular detection unit 124, a distance measuring unit 126 and a speaker 128. The control unit 110 may include a processor 130, a transceiver 132, a graphical user interface (GUI) 134, (e.g., a keyboard, a mouse, and the like), a speaker 136, a microphone 138, a global positioning system (GPS) 140, a distance measuring unit 142, and a plurality of alarm units $144_1$-$144_N$, each alarm unit 144 including at least one of a vibration strap, an audible alert device, and the like. Each of the lower detection units 115 may include a processor 150, a transceiver 155 and a distance measuring unit 160.

Electronic based distance measuring devices are readily available. These devices may utilize laser light in order to perform distance measurements. The operation of these devices may be initiated by pointing a laser at an object of interest and a measurement may be displayed on a screen.

The distances between a distance measuring unit and an object may be measured utilizing a "time of flight" technology. Alternatively, a multiple frequency shift technology may be used. When triggered, a laser distance measuring unit may emit a pulse of light and, almost simultaneously, the light may be reflected back to the laser distance measuring unit. The reflected light may be associated with a delay, whereby the distance between point A and B may be defined as follows:

$$D = c \times t / 2, \quad \text{Equation (1)}$$

where c is the speed of light (c=300,000,000 meters per second) in the atmosphere, and t is the amount of time for the round-trip between A and B. Laser distance measuring units that are readily available may measure distances up to 200 feet and have an accuracy of plus or minus 1/16 inch.

In accordance with one embodiment, the trigger mechanism and the firing position of the beam (laser) of the distance measuring units may be computer (e.g., processor) controlled to define the firing angle for each of the vertical and horizontal settings. Each of the obstruction detection units 105 and 115 may communicate with the transceiver 132 of the control unit 110 via their respective transceivers 122 and 155, (e.g., via Bluetooth or any other wireless communication technology). As part of the data they transmit, each subassembly may be assigned an identifier so that the control unit 110 may keep track of where the subassembly is located on the visually impaired user's body. In order to determine the field of view of the user, the system 100 may be configured to automatically calculate the height of the user prior to entering an obstruction detection mode, whereby the user begins to walk step by step.

While the user is facing a wall, the distance measuring unit 126 in the upper obstruction detection unit 105 may be instructed by the processor 120 to measure the distance to the wall, utilizing maximum firing angle limits. The collected data by the distance measuring unit 126 may be tabulated, and only the minimum value may be retained and be made available for the processor 120, which subsequently may relay the minimum value to the control unit 110 via transceivers 122 and 132 to be utilized for further calculations. The minimum distance recorded may indicate the point at which the user's head is level. The speaker 128 in the upper obstruction detection unit 105 may be configured to couple fixed or variable audible signals from processor 120 as instructed by the control unit 110, to provide the user with instructions.

The horizontal and vertical angular detection unit 124 of the upper obstruction detection unit 105 may be configured to continuously monitor the user's head position, as instructed by the processor 120, and provide the collected coordinate data to the processor 120, which subsequently may relay the data to the control unit 110 via transceivers 122 and 132, so that calculations of the field of view may be performed.

The distance measuring unit 126 in the upper obstruction detection unit may be configured to scan a field of view as instructed by the processor 120. The processor 120 may instruct the distance measuring unit 126 to scan a field of view, as instructed by the control unit 110.

The GUI 134 in the control unit 110 may be configured to accept entries via graphics and provide the chosen entries and less important limits to the processor 130. The speaker 136 in the control unit 110, as well as the speaker 128 in the upper obstruction detection unit 105, may be configured to provide warnings and instructions to the user as they relate to system operation and status. The microphone 138 in the control unit 110 may be configured to allow the user to enter emergency help commands, to dictate simple instructions and access and navigate the GPS 140. The alarm units 144 in the control unit 110 may be configured to activate in response to the detection of steps, an emergency event or an obstruction by providing navigational instructions.

The distance measuring unit 142 in the control unit 110 may be configured to scan a field of view as instructed by the processor 130. Based on inputs received by the transceiver 132 of the control unit 110 from transceivers 122 and 155, the transceiver 132 may transmit field of view instructions and firing angle instructions to the transceivers 122 and 155.

Figure 1B:
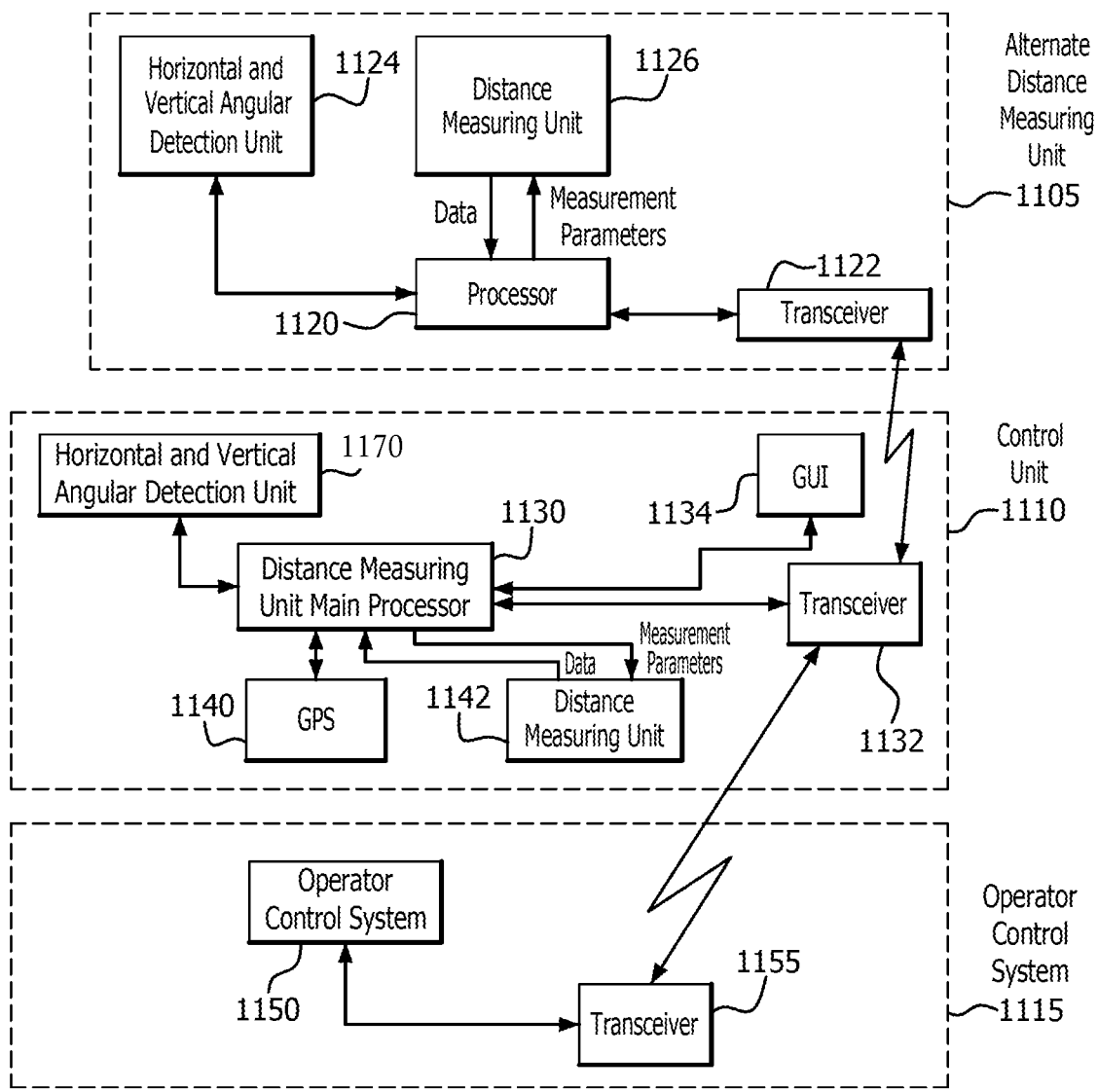
FIG. 1B shows a block diagram of a control unit in accordance with one embodiment.

FIG. 1B shows a block diagram of a control unit in accordance with one embodiment. The system 1100 may again include an alternate distance measuring unit 1105, a control unit 1110 and an operator control system 115. While a single operator control unit 1110 is shown, any number of control units may be used. Each of the subassemblies of the system may include a control unit and a distance measuring unit, which may be secured on a drone and be utilized during the field of view mapping process. The subassemblies may be powered by a combination of one or more batteries.

The field of view may be selected by entering length and width of the desired field. The control unit 1110 may utilize the drone camera to bring the field into view and then manually direct the laser light from the distance measuring unit 1142 for the selection of each corner of the field. The system 1100 may calculate the perimeter and then display it on the operator control system 1150. The control unit 1110 may redefine the selected perimeter points so that two of the sides are equal and that all the interior angles are 90 degrees.

Each of the distance measuring units located on a drone may have an adjustable firing angle for the laser light. The laser light firing angle starting point may be defined by the control unit 1110, after it receives inputs from the alternate distance measuring unit 1105. The control unit 1110 may provide the starting laser light firing angle as long as the horizontal and vertical angular detector units 1170 are clear from alarm. The control unit 1110 may automatically select the firing angle to cover the designated field of view. If the control unit 1110 position changes during a data gathering cycle, the control unit 1110 may stop the scanning and discard the collected data before moving to new coordinate settings. Once the new coordinate/position has been determined, the control unit 1110 may determine the size of the field of view to be monitored and provide the determined field size to the control unit 1110. The total field of view calculations may be repeated every time the control unit 1110 position changes from a previous data gathering position.

The distance measuring units may not be in sync with each other. Thus, each distance measuring unit may independently collect and report collected data to the control unit 1110 for the specified field of view. The distance measuring units may be capable of adjusting their laser light firing angle when instructed by the control unit 1110.

As shown in FIG. 1B, the control unit 1110 may include a distance measuring unit main processor 1130, a transceiver 1132, a horizontal and vertical angular detection unit 1170, a distance measuring unit 1142, a graphical user interface (GUI) 1134 and a global positioning system (GPS) 1140.

Electronic based distance measuring devices are readily available. The computer controlled distance measuring unit 1105 may receive inputs from the operator in order to define the mapping resolution. The distance measuring unit 1105 may calculate the number of data points to cover the requested resolution for the specific field to be mapped. The system 1100 may utilize laser light in order to perform distance measurements. The operation of these devices may be initiated by pointing a laser at an object of interest and a measurement may be displayed on a screen.

The distances between a distance measuring unit and terrain may be measured utilizing a "time of flight" technology. Alternatively, a multiple frequency shift technology may be used. When triggered, a laser distance measuring unit may emit a pulse of light and, almost simultaneously, the light may be reflected back to the laser distance measuring unit. The reflected light may be associated with a delay, whereby the distance between point A and B may be defined as provided in Equation (1), where c is the speed of light (c=300,000,000 meters per second) in the atmosphere, and t is the amount of time for the round-trip between A and B. Laser distance measuring units that are readily available may measure distances up to 200 feet and have an accuracy of plus or minus 1/16 inch.

In accordance with one embodiment, the trigger mechanism and the firing position of the laser of the distance measuring units may be computer (e.g., processor) controlled to define the firing angle for each of the vertical and horizontal settings. The control unit 1110 may communicate with the operator control system 1115 via their respective transceivers 1155 (e.g., via Bluetooth or any other wireless communication technology). In order to determine the field of view, the system 1100 may be configured to automatically calculate the length and width of the field. The operator may use the drone camera to select the field of view, once the picture is available on the screen of the control, the operator can direct the distance measuring system to mark the four corners by simple guiding and mark each of the four corners. The control unit 1110 may calculate the best fit area which contains each of the four selected points. The resultant field of view may have the shape of a square or rectangle. Once the field of view has been determined the scanning process may be initiated.

While the drone is located above the terrain of interest, the distance measuring unit 1126 may be instructed by the processor 1120 to measure the distance to the terrain by allowing the control unit 1110 to determine firing angle limits and number of distance measured data points for maximum resolution for the field to be mapped. The collected data by the distance measuring unit 1126 may be tabulated while noting the minimum and maximum values of the distances measured; this data includes points associated with the peaks and valley of the scanned terrain. The data may be retained and be made available to the processor 1120, which subsequently may relay the calculated values to the operator control system 1115 for further processing. The minimum distance recorded may indicate the highest point of the selected terrain while the maximum distance may indicate the lowest point of the selected terrain.

The collected data may be sent to TV producers/editors for conditioning, a picture criteria may be utilized to either increase or decrease the shading for highlighting the different levels of the terrain. The constructed terrain levels picture may be superimposed on a live TV transmission of the terrain to show the levels associated with the terrain. The resultant picture may enhance the live transmission thus giving the home viewer a view of what the golf player is faced with as he gets ready to putt. As the golf ball travels from the player position toward the hole the terrain details of the green may be visible to the TV viewer thus giving an added view showing as to why the ball is following a specific path toward the green's hole.

The horizontal and vertical angular detection unit 1124 of the control unit 1110 may be configured to continuously monitor the vertical and horizontal position of the drone as instructed by the processor 1120. If during the field of view mapping the horizontal or vertical position of the drone changes, the operator may be warned. The collected data for the scan may be discarded and the system may re-scan the selected field of view. Once a scan is considered valid the collected data may be sent to the operator control system 1115 for further processing. The collected data may be manipulated by the TV production crew prior to being superimposed on a live TV picture. The production crew may make any alignment adjustment prior to releasing the resultant picture for transmission.

The distance measuring unit 1142 in the control unit 1110 may be configured to scan a field of view as instructed by the processor 1120. The processor 1120 may instruct the distance measuring unit 1142 to scan a field of view, as instructed by the operator control system 1115.

The GUI 1134 in the control unit 1110 may be configured to accept entries via graphics as instructed by the operator control system 1115 and provide the chosen entries and less important limits to the processor 1130. Instructions to the control unit 1110 may be entered utilizing the speaker functions of the operator control system 1115. The operator control system 1115 may be configured to allow the operator to enter instructional commands to allow access to the control unit 1110, display the drone's GPS status and enter navigational instruction.

The distance measuring units 1142 associated with the drone may be configured to scan a field of view as instructed by the control unit processor 1130. Inputs may be generated by the television production crew or entered by the operator utilizing the dedicated RF communication channel to the control unit 1110. As the field of view is updated the system operating instructions, field of view resolution and firing angles instructions may be communicated utilizing the transceivers 1132 on the drone and on the operator control system 1115.

Figure 2A:
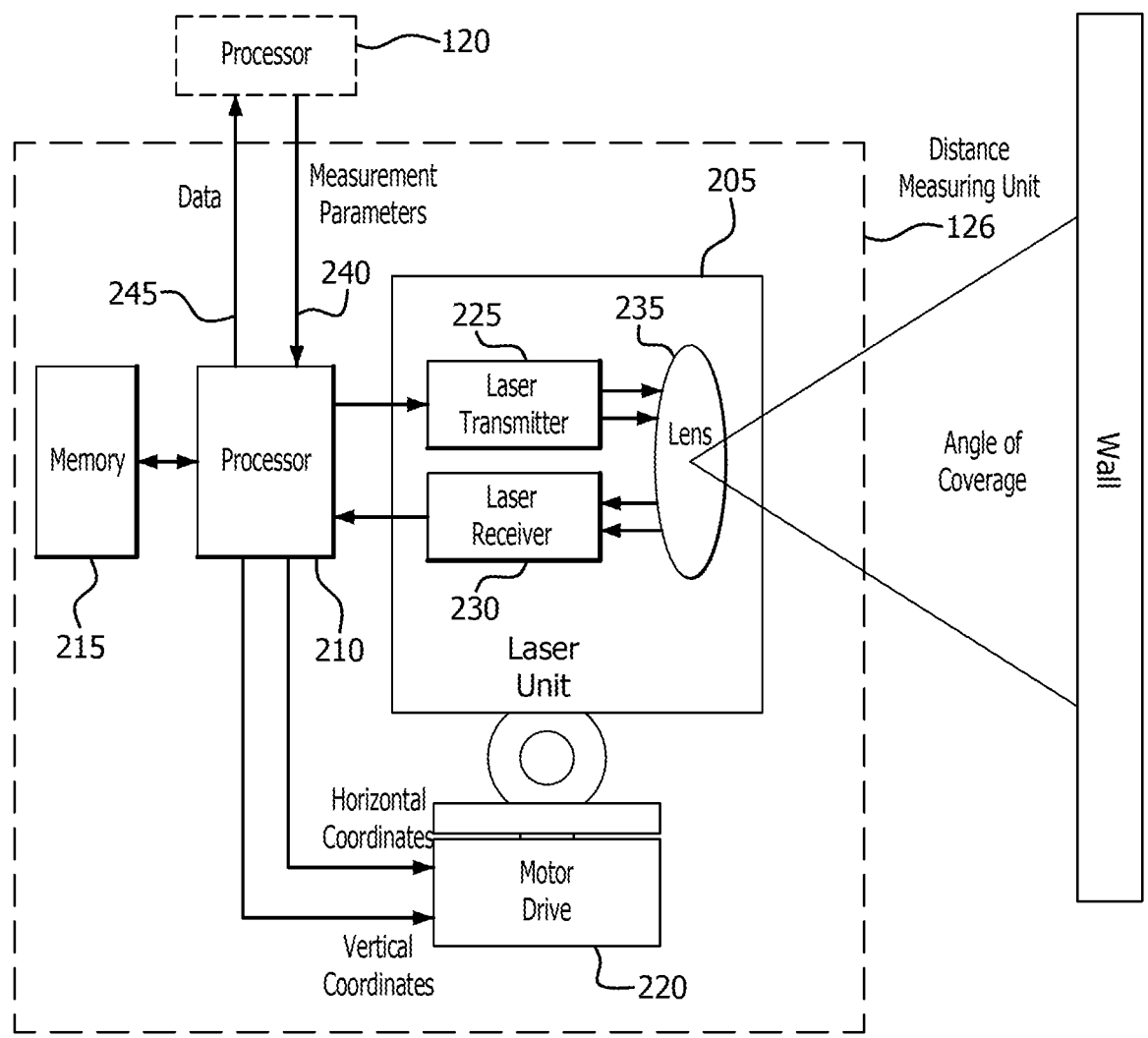
FIG. 2A is a block diagram of an example of a distance measuring unit of FIG. 1A.

FIG. 2A is a block diagram of an example of a distance measuring unit 126 used in the system 100 of FIG. 1. The other distance measuring units 142 and 160 may be configured in a similar manner. The distance measuring unit 126 may include a laser unit 205, a processor 210, a memory 215 and a motor drive 220. The laser unit 205 may include a laser transmitter 225, a laser receiver 230 and a lens 235 through which the distance of an obstacle from the user, in this case a wall, is measured at various firing angles to provide the appropriate vertical and horizontal angle coverage. The processor 210 may be configured to provide horizontal and vertical coordinates to the motor drive, whereby a computer-implemented procedure may be initiated to vary the transmitting angle of the laser unit 205 and calibrate the system 100 based on the user's vertical head position. Measurements are performed by the processor 210 based on data received from the laser receiver 230 and may be selectively stored in the memory 215. The processor 210 may control the laser unit 205 based on measurement parameters 240 received from the processor 120 of the upper obstruction detection unit 105, and provide selected measurement data 245 to the processor 120.

Figure 2B:
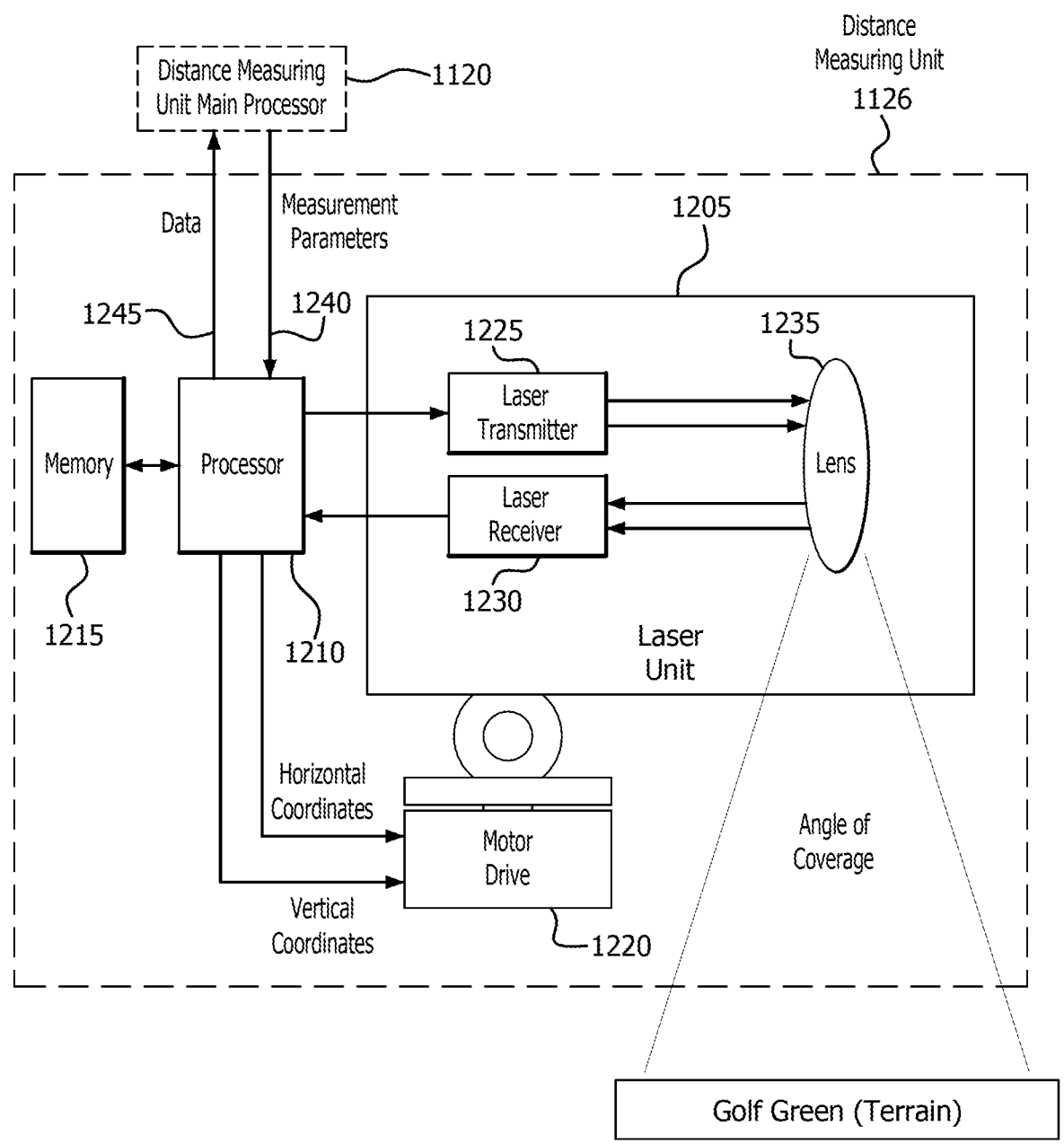
FIG. 2B is a block diagram of an example of a distance measuring unit used in the system of FIG. 1B.

FIG. 2B is a block diagram of an example of a distance measuring unit 1126 used in the system 1100 of FIG. 1B. The distance measuring units 1126 may include a laser unit 1205, a processor 1210, a memory 1215 and a motor drive 1220. The laser unit 1205 may include a laser transmitter 1225, a laser receiver 1230 and a lens 1235 through which the distance of the terrain from the drone, in this case a golf green, is measured at various firing angles to provide the appropriate vertical and horizontal angle coverage. The processor 1210 may be configured to provide horizontal and vertical coordinates to the motor drive 1220, whereby a computer-implemented procedure may be initiated to vary the transmitting angle of the laser unit 1205. Measurements are performed by the processor 1210 based on data received from the laser receivers 1230 and may be selectively stored in the memory 1215. The processor 1210 may control the laser units 1205 based on measurement parameters received from the processor 1120 of the control unit, and provide selected measurement data to the processor 1210.

Figure 3A:
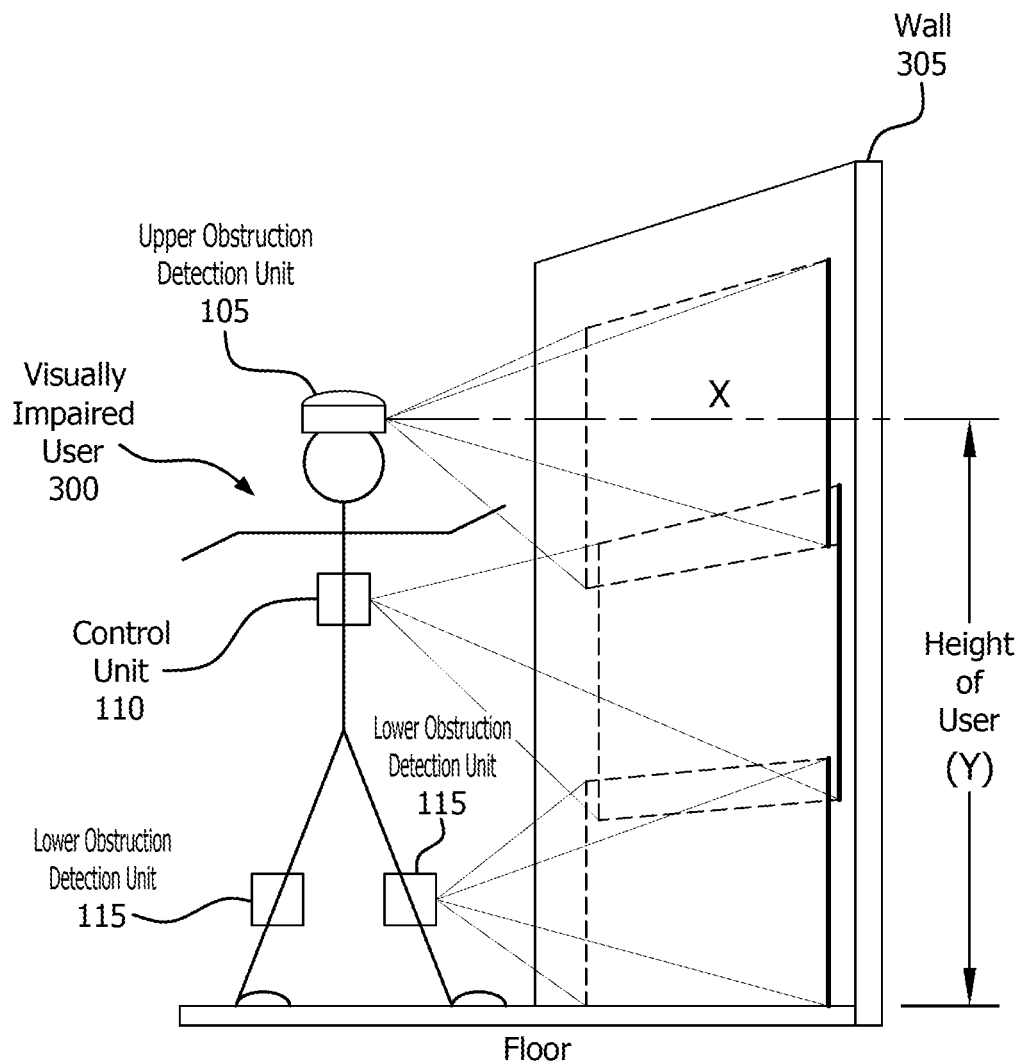
FIG. 3A is an example of vertical and horizontal angle coverage of the system of FIG. 1A.

FIG. 3A shows an example of vertical and horizontal angle coverage of the system of FIG. 1A. Once the system 100 has been secured to the user's body, the user may initiate a self-calibration procedure so that the system 100 may cover ample degrees of view in both the vertical and horizontal directions. A starting point defined by horizontal and vertical coordinates for the gathering of distance measurements may be provided to the upper obstruction detection unit 105 by the control unit 110 during the procedure.

The data from the horizontal and vertical angular detection unit 124 may reflect the vertical angle of the user's head, and it may continuously be transmitted to the control unit 110 for the creation of the field of view. In addition, the upper obstruction detection unit 105 may provide the degrees of rotation that the user's head is experiencing from a zero starting point. The zero starting point may be defined as the "straight out look with no vertical head tilt."

Upon completion of all start-up procedures, each distance measuring unit 126, 142, 160 may receive instructions from the processor 130 of the control unit 110 as to their specific field of view. For example, each distance measuring unit 126, 142, 160 may be configured to cover 136 degrees in the vertical axis and 180 degrees in the horizontal axis. The utilization of these wide angles may be reflected in the collection of non-valuable data. Thus, the control unit 110 may inform each of the distance measuring units 126, 142, 160 their respective operating field of view.

The distance measuring unit 126 in the upper obstruction detection unit 105 may provide the initial horizontal and vertical settings to the control unit 110, which may then calculate the starting firing angles to all of the distance measuring units 126, 142, 160 so that the requested field of view is covered. The above procedure may be repeated every time there is a change in the user's head position.

Each of the distance measuring units 126, 142, 160 may receive inputs regarding the field of view and the incremental steps for each horizontal and vertical coordinate from the processor 130 in the control unit 110. For every field of view, and for every distance measuring unit 126, 142, 160, there may be a volume of collected data utilized to create a model outlining obstacles whose distances are less than the minimum clear distance. If any of the distance measuring units 126, 142, 160 detect an obstacle, it may be reported to the control unit 110 so that it can be tabulated and mapped so that location and distance may be immediately reported to the user. Should the distance to an obstacle be less than the safe value, the control unit 100 may activate at least one of the alarm units 144 and activate the speaker 128, 136 to inform the user regarding the detected obstacle.

Each of the distance measuring units 126, 142, 160 may report the location of the closest obstacles to the control unit 110, so that the control unit 110 may create a model including the exact locations and respective dimensions. Once all of the data has been tabulated, the control unit 110 may report the findings for that scan. If there are concerns, then the system 100 may report the alarm to the user with details regarding the location and distance to obstacle.

To construct a field of view and to detect obstacles, the distance measuring units 126, 142, 160 may be respectively located in the upper obstruction detection unit 105 fastened to the user's head, the control unit 110 fastened to the user's upper body (e.g., chest), and the lower obstruction detection unit 115 below the knee (i.e., legs). The lower obstruction detection unit 115 may be fastened to the user in such a way so that ground level obstacles and steps may easily be detected.

As each foot of the user is lifted, the system 100 may recognize that the foot is moving away from the walking surface, and during this portion of the cycle there is no need to transmit the data that reflects the lifting of the foot. Once the system 100 detects that the furthest point from the walking surface has passed, the firing angle of the distance measuring units may be changed so that the system may detect objects that are further away from the visually impaired user. It may be in this mode that early detection of holes and steps may be detected.

The distance measuring units may adjust their firing angle so that the view area is maximized by increasing the scanned area so that early detection of obstacles may allow the system 100 to make the proper correction and provide warnings so that the user's pace is not disturbed.

The alarm units 144 may be secured to the arms of the user to transfer vibrations onto the user's skin surface when an obstruction is detected, (e.g., upcoming road obstacles, a hole on the road surface, steps, and object that may affect the user within the field of view). The alarm units 144 may be individually activated to indicate to the user the side where an obstacle is located. The system 100 may have the ability to warn the user before reaching the actual obstacle to avoid the user being injured. The user may have the ability to select the frequency, amplitude, and/or length of the alarm, and the repeatability for each of the alarms if the system 100 does not sense that action has been taken to prevent an accident. The system 100 may utilize a three step warning for whenever an obstacle is detected. The system 100 may allow the user to set the distance of when the first alarm (e.g., selection of distances 5, 10 or 15 feet to an object), warning may be activated or, if not selected, the setting may be fully automatic (distance may be relative to the walking pace). The system 100 may sound an alarm when the user's distance to an object is less than a predetermined distance, (e.g., 5 feet).

Figure 3B:
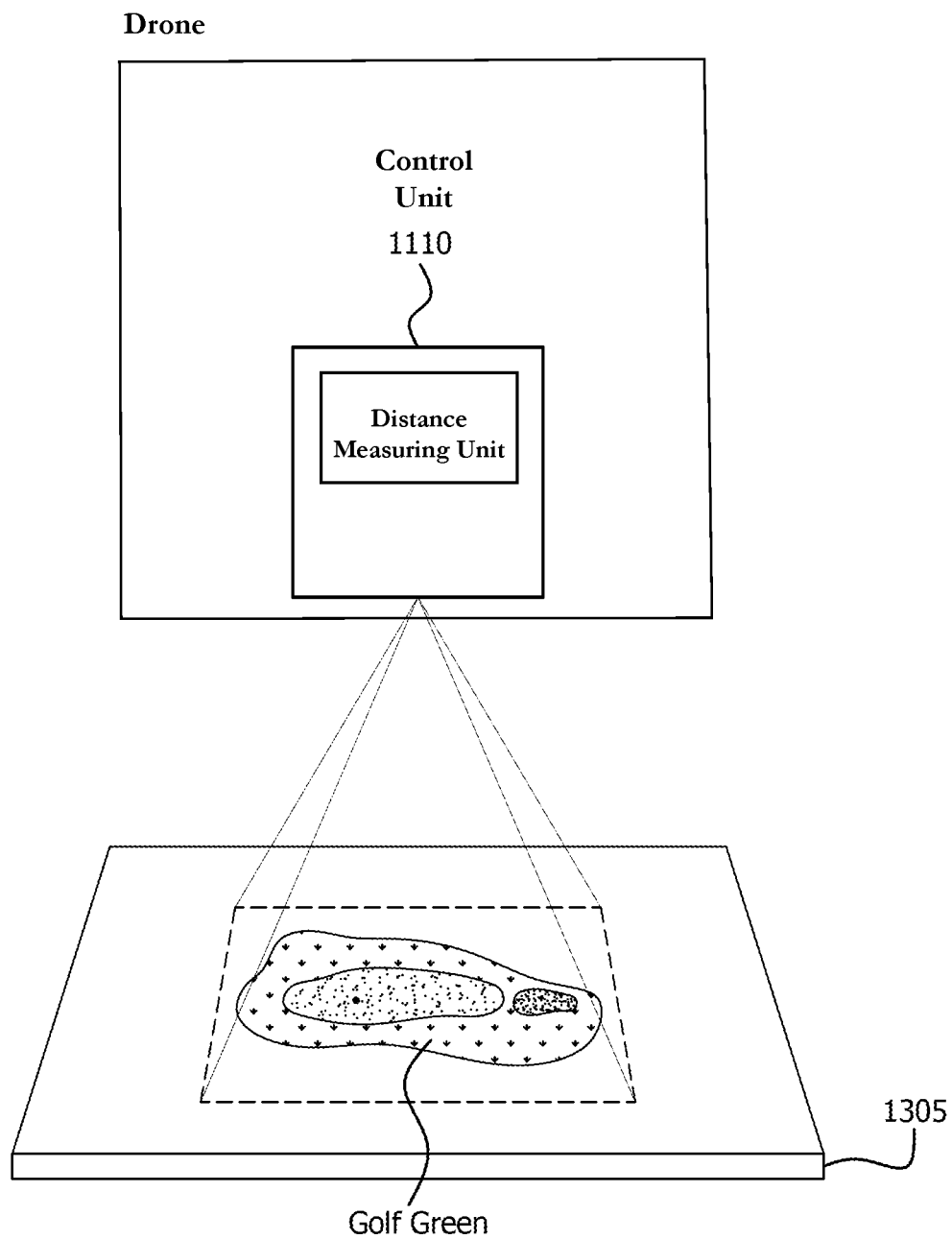
FIG. 3B shows an example of vertical and horizontal angle coverage of the system of FIG. 1B.

FIG. 3B shows an example of vertical and horizontal angle coverage of the system of FIG. 1B. Once the system has been secured to the drone's body, the operator may initiate a field of view set up procedure so that the control unit 1110 may cover ample degrees of view in both the vertical and horizontal directions. A starting point defined by horizontal and vertical coordinates for the gathering of distance measurements may be provided to the control unit 1110 by the operator via the operator control system as part of the start-up procedure.

The data from the horizontal and vertical angular detection unit 1124 may reflect changes in height and rotational position of the drone. Any change reported by the two detection systems may affect the selected field of view therefore should the changes occur during the scanning of the field of view the collected data may be discarded. In addition, the horizontal and vertical angular detection unit 1124 may provide the degrees of rotation that the drone is experiencing from a zero starting point. The zero starting point may be defined as the "drone position at the start of the scan" and should the value change between the start and stop of the scan for the selected field of view the system 1100 may recognize the change and the collected data may be discarded.

Upon completion of all start-up procedures, the distance measuring units 1126 may receive instructions from the processor 1130 of the control unit 1110 as to their specific field of view. For example, a distance measuring unit 1126 may be configured to cover 136 degrees in the vertical axis and 180 degrees in the horizontal axis. The utilization of these wide angles may be reflected in the collection of non-valuable data. Thus, the control unit 1110 may inform the distance measuring unit 1126 regarding the requested operating field of view from the operator.

The distance measuring unit 1126 in the control unit 1110 may provide the initial horizontal and vertical settings, which may then calculate the starting firing angles for all of the distance measuring units 1126 for assurance that the requested field of view is covered. The above procedure may be repeated every time there is a change in the drone's horizontal and vertical position.

Each of the distance measuring units 1126 may receive inputs regarding the field of view and the incremental steps for each horizontal and vertical coordinate from the processor 1130 in the control unit 1110. For every field of view and for every distance measuring unit there may be a volume of collected data utilized to create a model outlining distances from the drone to the terrain.

Each of the distance measuring units 1126 may report the distance to the terrain from the control unit 1110, so that it may create a model including the exact locations, orientation (field markers) and respective dimensions of the requested field of view. Once all of the data has been tabulated, the control unit 1110 may report the findings for that scan. If there are concerns, then the control unit 1110 may report the alarm to the user with details regarding the erroneous findings that surfaced during the mapping of the terrain.

To construct a field of view and to measure the distance from the drone to the terrain, the distance measuring units 1126 may be respectively located in the drone hardware compartment.

During the mapping of the terrain for the selected field of view, the control unit 1110 may detect changes in the horizontal and vertical detection unit, and whenever this occurrence takes place there is no need to transmit the collected data. Collected terrain data may be transmitted from the control unit 1110 to the operator computer only after the operating system confirms that the drone has not moved during the mapping of the terrain for the field of view.

The distance measuring unit may adjust the firing angle so that the view area is maximized by increasing the scanned area as per operator instructions.

Figure 4A:
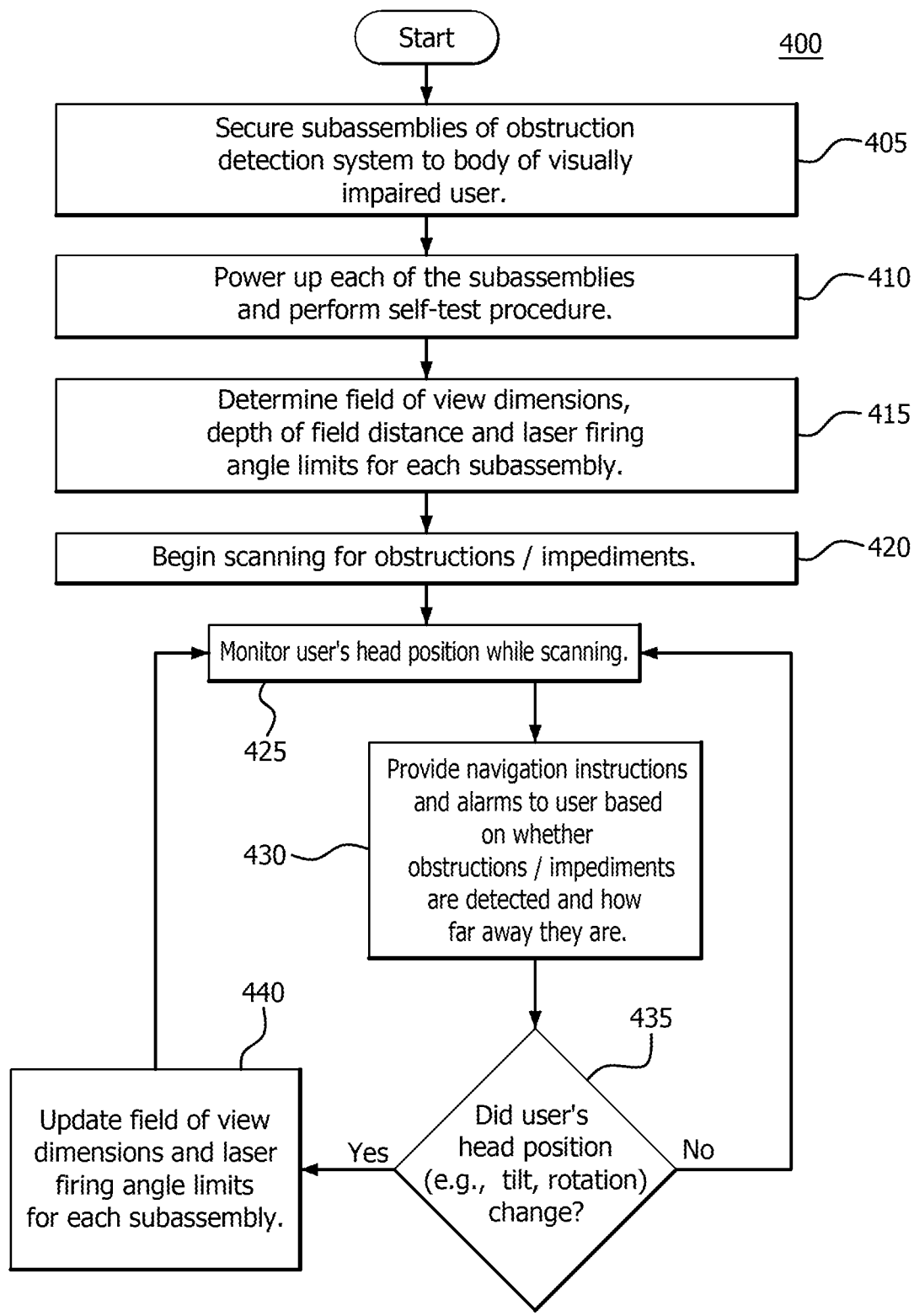
FIG. 4A is a flow diagram of a procedure used to guide and alert a visually impaired user of alert a visually impaired person of obstructions while walking.

FIG. 4A is a flow diagram of a procedure 400 used to guide and alert a visually impaired person of obstructions while walking. The subassemblies of the obstruction detection system are secured to the visually impaired user's body (405). Each of the subassemblies may be powered up and performs a self-test procedure (410). The field of view dimensions, depth of field distance and laser firing angle limits are then determined for each subassembly (415), and the system 100 begins to scan for obstacles or impediments (420). The user's head position is continuously monitored while scanning (425). Navigation instructions and alarms are provided to the user based on whether obstructions or impediments are detected and how far away they are (430). On a condition that the user's head position (e.g., tilt, rotation) changes (435), the field of view dimensions and laser firing angle limits are updated for each subassembly (440), and then the procedure 400 returns to monitoring the user's head position (425).

The communication between the control unit 110, the upper obstruction detection unit 105 and the lower obstruction detection units 115 of system 100 may communicate via the Bluetooth technology. Bluetooth radio frequencies may include the band of 2400.0 MHz-2483.5 MHz.

Adaptive scanning may be implemented in the system 100 such that that as the first steps by the user are taken, the system 100 may scan at a faster rate so that all of the fields may be updated. The field scanning rate may be directly related to the rate of motion of the visually impaired user. After each distance measuring unit completes a line of scanning, the system 100 may automatically adjust the setting of the firing angle for the laser light so that the new line may be scanned. This procedure may continue until the complete defined field is scanned. Each of the distance measuring units may operate as a standalone unit. However, the inputs for the field to be scanned may be provided by the control unit 110. At the end of every scanned field, each distance measuring unit may provide data containing reflected distance measurements.

Since the system 100 may have defined the depth of the field, any measured distance greater than the minimum required may be discarded. Once a full field has been scanned, the data may be transmitted to the control unit 110 where it may be processed. If any violations are present, the generating of alarms may be executed. Once an alarm command is released, the received data may be cleared and deleted. Thus, data from each distance measuring unit may be processed as it is received in order to determine the presence of obstacles.

The system 100 may create contour lines, (e.g., by sequentially connecting equal distance points utilizing a systematic as defined by each distance measured coordinate), thus outlining the physical size of the object. The utilization of the collected data may allow the control unit 110 to create an image similar to a topographical map and simultaneously check if any of the measurements have violated the minimum clear distance dimension. The outline of the detected obstacles and respective location may be informed to the visually impaired. Once an obstacle size and location has been detected the system can re-adjust the field of view so that a collision is prevented, while pace and stride is maintained.

Once the field of view is created, any received data that is associated with distances greater than the minimum defined depth of field may be discarded. After each field of view data has been received by the distance measuring unit and violations have been annunciated, the data may be discarded after the field of view status for each distance measuring unit has been completed.

Each distance measuring unit may process the collected data (look for measurements violations) and report the finding to the control unit 110. The control unit 110 may generate an alarm if obstacles have violated the minimum distance limit.

After each distance measuring unit completes the field of view scanning, the system may refresh the starting scanning angles for all distance measuring units; in addition the field of view may also be receptive to changes as requested by the visually impaired. Each of the obstruction detection units 105, 110 and 115 may have computing capabilities so that each may determine the location and size of the upcoming obstruction. The system 100 may start scanning at the upper left hand corner and end at the bottom right hand corner of the outlined field of view. The transmitted data from each of the units 105 and 115 may be in the form of STUVWXYZ, where S=Device Identification, XXXYY; T=Start Firing angle X direction, degrees; U=End Firing angle X direction, degrees; V=Start Firing angle Y direction, degrees; W=End Firing angle Y direction, degrees; X=Firing angle step in X direction, degrees; Y=Firing angle step in Y direction, degrees; and Z=Measured distance, inches.

For example, a data transmit structure for one distance measured reading may be: XXXYY, 2, 110, 20, 75, 1, 1, 110, where the first measured data point for this scan may indicate the following:
 S=Device Identification, XXXYY;
 T=Start Firing angle X direction, degrees . . . 2;
 U=End Firing angle X direction, degrees 110;
 V=Start Firing angle Y direction, degrees . . . 20;
 W=End Firing angle Y direction, degrees 75;
 X=Firing angle step in X direction, degrees . . . 1;
 Y=Firing angle step in Y direction, degrees . . . 1; and
 Z=Measured distance, inches 110.

The total number of data points for the above field of (U−T)×(W−V)=108×55=5940.

Each of the sub-assemblies required for the overall operation of the system may contain device identification (ID). The ID may be utilized to confirm operation and presence within the control unit network. The ID may be automatically assigned by the control unit 110 every time a new assembly is added for the detection of obstacles. The structure of the ID may be part letters and part numbers as follows: Device Identification=XXXYY, where XXX may be letters from A to Z and YY may be digits from 1 to 99. It should be noted that other identification schemes may be used without departing from the general features described above.

The control unit 110 may receive inputs from the upper obstruction detection unit and calculate the total field of view dimensions and each of the distance measuring units' field of view dimensions. The field of view may take into account the user's physical size and may additionally allow area for a guard band.

A system starting point may be that of a vertical distance of 8.5 feet and a horizontal distance of 10 feet, which provides a total of 85 square feet. The field of view for each distance measuring unit may be determined by the control unit 110. The control unit 110 may determine the depth of field, whereby any measured data that is less than the selected distance field may be retained while any measured distance that is greater may be discarded. The control unit 110 may calculate the depth of the field based on the square footage of the view. For example, if the system is monitoring an area of 8.5 feet high and 10 feet wide, any measured distance that is greater 20 feet may not be retained.

The firing angle for each of the distance measuring devices may be dictated by the control unit 110. The firing angle may be based on the tilt and the rotation of the user's head. The information may be sent to the control unit 110 for calculating the details for each of the distance measuring devices so that full coverage of the field of view is achieved. The control unit 110 may provide the following to each of the distance measuring devices:
 S=Device Identification, XXXYY;
 T=Start Firing angle X direction, degrees;
 U=End Firing angle X direction, degrees;
 V=Start Firing angle Y direction, degrees;
 W=End Firing angle Y direction, degrees;
 X=Firing angle step in X direction, degrees;
 Y=Firing angle step in Y direction, degrees; and
 Z=Measured distance, inches.

If requested or required, the system 100 may increase or decrease the step size between firing angles in order to increase or decrease the resolution of the field of view.

Once all of the subassemblies of the system 100 have been secured on the visually impaired user, a power command may be sent by the user when depressing a start button on the control unit 110, which in turn may issue a power up command to the remaining subassemblies (i.e., the upper obstruction detection unit 105 and the lower obstruction detection units 115). Each of the subassemblies may have an ID, thus assuring that only the control unit 110 may be allowed to communicate with the subassemblies. Assurance of a successful powering sequence by each of the subassemblies may be sent to the control unit 110. During the power up sequence, the control unit 100 may collect data from each associated device as it relates to battery status, (e.g., amount of battery power remaining).

After assuring that all subassemblies are secured, the control unit 110 may poll all of the subassemblies and confirm that radio frequency (RF) communication and data transfer is properly working between any subassembly and the control unit 110. The control unit 110 may send commands to all of the subassemblies instructing them to confirm the scanning area. Upon receiving data, each distance measuring unit may be evaluated for targeted versus actual view, and if the actual view is not within the targeted range, the control unit 110 may be reset and the start-up operations may have to be re-run. The control unit 110 may instruct the user to adjust the upper obstruction detection unit so that operability throughout the selected area dimensions is possible. The alarm units 144 may be activated to confirm functionality.

After the power up sequence has been completed, the control unit 110 may initiate a system initialization routine for each subassembly. Upon confirmation that each associated subassembly is powered and communicating, the control unit 110 may issue a self-calibrate command (e.g., establish height of user, numbering of distance measuring devices, alarm distance, and field of view). Once all of the subassemblies have been secured, they may be polled and each may be automatically identified. The control unit 110 may communicate with each of the subassemblies secured to the visually impaired user so that data communication, battery status, unit location, and unit orientation are reported to the control unit 110. In addition, alarm warning limits may be entered into the system during the initialization process.

As part of the initialization, the user may select the preference of the operation. The user may select either an automatic or user defined mode to define and monitor the field of view. The control unit 110 may request that the maximum operational distance from the user be selected, which may allow the system to discard any distance readings greater than those selected. Once the user selects the operational distance, the control unit 110 may monitor the upper obstruction detection unit so that it may globally send the coordinates to the remaining distance measuring units for the starting scanning angle.

After all of the subassemblies of system 100 have been secured to the user, the control unit 110 may instruct the user to face a wall and stay back at least 6 feet away from the wall. Once the user has moved back to a minimum of 6 feet away from the wall, instructions may be provided by the control unit 110 for all of the distance measuring units 126, 142 and 160 to provide a distance reading (where the coordinate for each unit may be 0,0). The user may be instructed to stand upright, keep his or her head level and face straight ahead to the wall, while each of the distance measurement units 126, 142 and 160 take measurements. Once all of the measurements have been received, the control unit 110 may determine whether all of the subassemblies have been correctly mounted by checking whether the measurements performed by the subassemblies are within a selected accuracy tolerance. The user may be asked to enter the unit of measurement for the reporting of data, (e.g., feet or meters).

After all of the subassemblies of system 100 have powered up, each may go through a self-calibration cycle. During this calibration cycle, each subassembly may be tested for functionality, two way radio frequency (RF) transmission, battery status, and generating alarms. Once the self-calibration cycle has been completed, the user may be asked to position his or her body at some known distance from a wall. Once the user is facing a wall, all of the distance measuring devices may go through a sequence of measurements for assuring that the user's distance from the wall is confirmed from multiple devices. During this stage, Pythagorean calculations may be performed to assure the correct positioning of the distance measuring devices on the user.

The system 100 may utilize Pythagorean calculations in order to determine distance to obstruction, height of the obstruction, height of the step, distance to a step, which foot may have to step down or step up and whether steps are going up or down. As a result of this calibration, the field of view may be determined, which may take into consideration: head position, user height, extension of arms, spreading of arms and feet. The user may be instructed so that each step can be correctly completed. While in a standing position, the control unit 110 may calculate and inform the appropriate field of view to each of the distance measuring units.

Alarm detection and informing may be exercised while acknowledgement from the user may be confirmed. Once the system 100 determines the height of the visually impaired user through the usage of tables and Pythagorean calculations, the system 100 may establish the total height and width limits for the field of view. The firing angles for the distance measuring units may cover an area that exceeds the user's total body size with extended limbs. The system 100 may calculate the firing angles for all distance measuring devices for both vertical and horizontal positions, as dictated by the head movement.

Since the system may utilize multiple distance measuring units, the total field of view may be divided amongst them as determined by the control unit 110. The system 100 may calculate and inform the firing angle to every distance measuring unit every time the system 100 is started, or anytime the user's head position has changed from the previous scan. The scanning direction may be controlled from left to right or right to left. After each horizontal scan, the system 100 may automatically increase or decrease the vertical firing angle until it has completed the requested field of view. Should the user move his or her head, the system 100 may recognize the new head position and make all of the required corrections and calculations so that the new field of view reflects the horizontal and vertical position of the user's head. For the distance measuring units 160 in the units 115 secured on the user's legs, the system may split the coverage for each device so that each one of them may cover half of their field of view.

The system 100 may be able to interpret data received from the leg mounted subassemblies 115 to determine at what distance is a step away from the user. When the system 100 determines that the received data has a specific pattern, it may start constructing models and may determine that a step pattern is present. The system 100 may decipher the collected data and determine the height of the rise and the length of the run of a step.

As the user's foot gets closer to the step, the distance measuring unit 160 may detect the drastic changes in the measured distance data. Distance data measurements (when a foot is on the ground) may show that the distance to a step may drastically change whenever the user goes through a 90 degree angle. The drastic changes may determine whether there is a transition from riser to run, or run to riser. Once the presence of a step is determined, the system 100 may inform the user as to which leg needs to be lifted first (the instructions may be provided via audio or via the alarm coupling mechanism). Once a foot has been planted on the run of a step, the monitoring of distances by the system may automatically guide and inform the user as to what needs to be done so that the two feet are resting on the same step.

The system 100 may run in either an automatic mode or a manual mode. The complexity of the system 100 cannot rely on the entering of coordinates as steps are taken, or the constantly changing field of view. The inputs of coordinates and settings may be difficult for the continuous operation of the product if manual mode were to be selected thus it is recommended that the operation of the unit be automatic.

The detection of obstacles in the path of a visually impaired requires that the system is fully operational and that the functionality of limit settings be determined as a function of user physical size rather than user direct entry. When in automatic mode, the system 100 may construct the field of view by determining the physical dimensions of the visually impaired plus an additional area for an added guard band.

In order to minimize user intervention, the system may operate in automatic mode. Upon completion of securing the devices to the user and having confirmed that all of the subsystem operations are faultless, the control unit 110 may inform the user that the running of the system 100 is automatic (i.e., there are no direct entries that need to be made as the user gets ready to take the first step).

The start scanning command for all of the distance measuring devices may be controlled by the user's head position. The system 100 may execute and update as steps are taken by the user, thus minimizing user interactions as the user moves. The control unit 110 may constantly update the field of view as it receives inputs from all of the distance measuring units in system 100, and correctly informs the user of upcoming obstacles and their respective locations. The configuration of the field of view is fully automatic, and it is the user's head position that triggers the construction of the field of view before the firing angle for all of the distance measuring devices is determined. Whenever the system 100 is running on automatic mode, the scanning of the field of view may start as soon as the user lifts a foot.

Once the field of view is created, the control unit 100 may inform each of the distance measuring units of their respective field of view. Once the distance measuring units receive the field of view updates from the control unit 110, each distance measuring unit may complete the present scanning cycle and update the scanning tables to reflect the latest inputs before new distance measuring cycle is started.

The system may require some manual entries initiated by the user. The user may be asked to power the control unit 110 and, in addition, confirm that correct steps are taken as the system 100 is being calibrated. Manual entries may be required, but their number may be kept at a minimum.

The user may be able to choose the method by which alarms may be informed. Alarms may be coupled to the user utilizing audio tones and vibration pulses. The system 100 may generate warnings when: minimum clear distance, distance to obstruction, height of the obstruction, height of the step and distance to the step are detected. In addition, the control unit 110 may provide instructions utilizing the alarm coupling mechanism, (e.g., direction, determine which foot may have to step down or step up, or the ability to determine whether steps are going up or down).

In one embodiment, a computer-implemented method of guiding a visually impaired user of a navigation system may be implemented to avoid obstructions and impediments while walking. The user may wear a plurality of subassemblies of the system anywhere on his or her body. For example, the subassemblies may be incorporated into one or more of a shoe, eyewear (goggles, glasses), a hat, a helmet, a watch, a smart phone, and the like. The tilt and rotation of the user's head may be monitored using one of the subassemblies worn on the user's head. Based at least in part on the tilt and rotation of the user's head, vertical and horizontal firing angles used by a distance measuring unit in each of the subassemblies may be calculated to transmit and receive laser signals to perform measurements. Navigation instructions and alarms may be provided to the user based on whether an obstruction or an impediment is detected that is closer than a predetermined distance to the user while the user is walking based on the measurements.

Field of view dimensions, depth of field distance and laser firing angle limits may be determined for each of the distance measuring units. An initialization procedure may be performed by instructing the user to change physical position with respect to the user's distance from a wall and the user's head position, while each of the distance measuring units transmits and receives laser signals at different vertical and horizontal firing angles to perform measurements.

One of the subassemblies may serve as a control unit 110 that is worn on the user's chest and communicates with all of the other subassemblies. The control unit 110 may calculate a total field of view to be scanned based on data provided by the subassembly worn on the user's head. The control unit 110 may calculate the field of view dimensions for each of the distance measuring units. A horizontal and vertical angular detection unit located in the subassembly worn on the user's head may be used to determine tilt and rotation of the user's head. The control unit 110 may calculate the vertical and horizontal start firing angles based on the tilt and rotation of the user's head. One of the subassemblies may be worn on the user's left leg and another one of the subassemblies is worn on the user's right leg. As understood by one of ordinary skill in the art, additional subassemblies may be added to cover the sides and/or the rear of the user at various distances above ground level. Alternatively, the subassemblies may be configured to provide 360 degree coverage.

In another embodiment, a computer-implemented method of guiding a visually impaired user of a navigation system may be implemented to avoid obstructions and impediments while walking. The user may wear a plurality of subassemblies of the system. Field of view dimensions, depth of field distance and laser firing angle limits may be determined for a distance measuring unit in each of the subassemblies. Each of the distance measuring units may transmit and receive laser signals at different vertical and horizontal firing angles to perform measurements. Navigation instructions and alarms may be provided to the user based on whether an obstruction or an impediment is detected that is closer than a predetermined distance to the user while the user is walking based on the measurements.

In another embodiment, a navigation system may include a plurality of subassemblies worn by a visually impaired user to avoid obstructions and impediments while walking. Each of the subassemblies may comprise a distance measuring unit comprising a laser unit configured to transmit and receive laser signals to perform measurements. A control unit may be configured to communicate with each of the subassemblies and provide navigation instructions and alarms to the user based on whether an obstruction or an impediment is detected that is closer than a predetermined distance to the user while the user is walking based on the measurements.

In another embodiment, a non-transitory computer-readable storage medium may contain a set of instructions for assisting a visually impaired user to navigate around obstacles and impediments while walking. At least one of the instructions may be used for calculating, based at least in part on tilt and rotation of a user's head, vertical and horizontal start firing angles used by a plurality of distance measuring units to transmit and receive laser signals to perform measurements. At least another one of the instructions may be used for providing navigation instructions and alarms to the user based on whether an obstruction or an impediment is detected that is closer than a predetermined distance to the user while the user is walking based on the measurements.

Figure 4B:
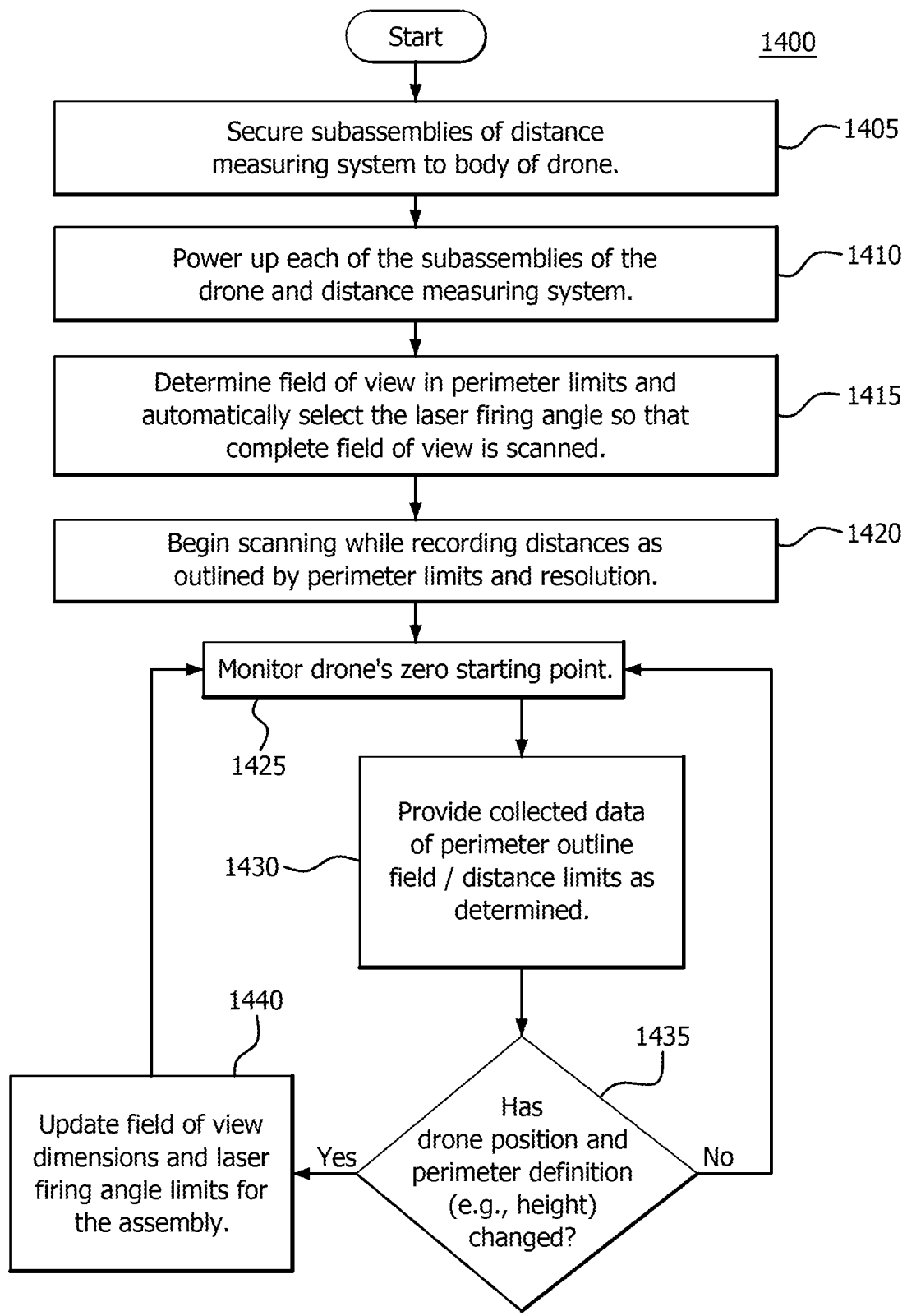
FIG. 4B is a flow diagram of a procedure used to guide and map a terrain.

FIG. 4B is a flow diagram of a procedure 1400 used to guide and map a terrain. Each of the subassemblies may be powered up and each performs a self-test procedure prior to the drone being airborne. The field of view dimensions, orientation, depth of field distance and laser firing angle limits may be determined for each subassembly. The utilization of multiple distance measuring systems within the drone assembly allows for the collecting of data while the drone is properly oriented and located at a control height above the terrain. The collected data when formatted and plotted illustrates the terrain details. Once the scanning of the desired terrain is initiated, the drone's position may be continuously monitored. Alarms may be provided to the operator based on whether drone's horizontal and vertical positions have changed during the mapping process. On a condition that the system operator has requested changes for field of view optimization, the field of view dimensions and laser firing angle limits may be updated for each of the distance measuring sub-assemblies allowing the system to resume the monitoring of the drone's horizontal and vertical position prior to start the mapping process.

Procedure 1400 includes the subassemblies being secured to the body of the distance measuring system (1405). Each of the subassemblies may be powered up (1410). The field of view in perimeter limits and automatically selects the laser firing angle so that the complete field of view is scanned (1415). The system 1100 begins to scan the terrain (1420). The drone's zero starting point is continuously monitored while scanning (1425). Determine from collected data of perimeter outline field distance limits on instructions (1430). On a condition that the drone's position and perimeter definition (e.g., height) changes (1435), the field of view dimensions and laser firing angle limits are updated for the assembly (1440), and then the procedure 1400 returns to monitoring the drone's zero starting point (1425).

Figure 5:
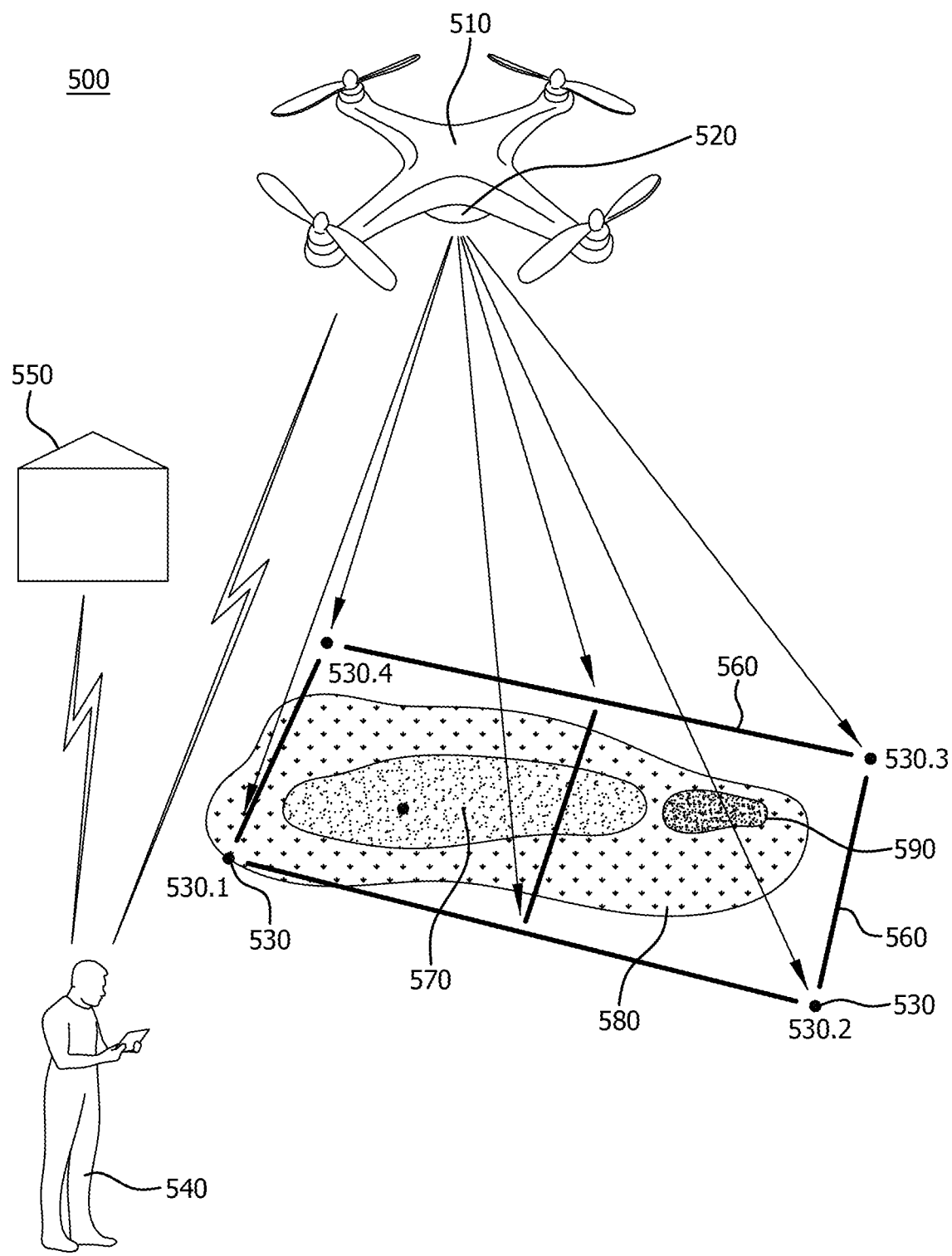
FIG. 5 is a pictorial of the mapping system utilizing a distance measuring device.

FIG. 5 illustrates a configuration 500 of the present system utilizing a distance measuring device to map terrain. Configuration 500 includes a drone 510 of other device configured to provide a distance measuring unit 520, or multiple distance measuring units (not shown) a view to measure the terrain 560. As depicted, terrain 560 includes a golf green and associated terrain. The terrain 560 may be surrounded by terrain markers 530. As depicted, the terrain markers 530 include a first marker 530.1, a second marker 530.2, a third marker 530.3, and a fourth marker 530.4. Markers 530 may be designed to provide a rectangle or square area surrounding the terrain 560. As illustrated by the arrow lines, distance measuring unit 520 may measure the distance to terrain 560. This may include at least each of terrain markers 530, for example.

Terrain 560 may include a golf terrain. The terrain may include a green 570, a rough area 580, and a bunker 590, for example. As shown, markers 530 define an area that circumscribes terrain 560 including each of green 570, rough area 580, and bunker 590. As markers 530 define the area or region of terrain that is to be mapped, by including terrain 560 with green 570, rough area 580, and bunker 590 within markers 530 ensues that system 500 maps terrain 560 including mapping each of green 570, rough area 580, and bunker 590.

The following is a brief description of the mapping of the terrain utilizing a drone equipped with the described computer-implemented distance measuring system. Once the computer-implemented distance measuring system is powered and the drone is airborne, the operator may position the drone away from the field to be mapped. System checks may be executed including orientation and position confirmations after which drone position controls may be locked.

Perimeter corner markers or other reference markings may be positioned on the terrain. The operator may drag a basic geometrical shape (square or rectangle) on the screen to best fit the area as outlined by the four markers. The system may make dimensional adjustments so that parallel sides are equal in length and that each corner angle is 90 degrees.

The operator may utilize the drone's camera for directing the laser beam on the corner of the geometrical shape at point 0 0 (lower left on the monitor). The system may assign coordinate values (0 0, 0 Y, X 0, X Y) to the rest of the corners to reflect outlined perimeter and mapping start and stop endpoints. The description as outlined in this document reflects the mapping process when starting at point (0 0). Mapping of the selected perimeter can be started from any of the four corners and in any direction. All of the distance measurement data points from the drone to the terrain may be recorded, such as by utilizing a spreadsheet format.

Once selected, the step size firing angles settings for the horizontal and vertical directions may be locked until the entire field of view mapping is completed. The collected distance measurements data points are used by the system to calculate (utilizing Pythagorean calculations) the vertical distance from the drone to the terrain.

Once mapping is initiated, the laser may be directed to point at coordinate (0 0) and instantaneously the first distance measurement data point is taken. The distance from drone to terrain is determined and the result is recorded. The system may automatically increase the horizontal firing angle and repeat the measurement. Distances measurements continue until the last collected data point reaches the boundary marked by 0 X. At this point, the first line of the field of view has been scanned and the laser is instructed to return to the line starting point after which the vertical firing angle may be increased. Scanning of the second line may automatically start and the measurement process may be executed as per line 1. The distance measurement procedure is repeated until the vertical boundary 0 Y is reached and boundary point (X Y) is detected and measured. Once this is achieved, the system has been able to collect, calculate and record distances from drone to terrain required to map the field of view.

The drone may be instructed to return home while the collected data is transferred to personnel for further conditioning and later be utilized for the construction of a topographical map. While this example mapping indicates that an operator performs certain functions, it is understood that the system may automatically perform such functions rendering an operator unnecessary.

The drone 510 and the associated distance measuring unit 520 may be controlled by an operator 540. Drone 510 and the associated distance measuring unit 520 may instead act autonomously. In either operation mode, drone 510 and the associated distance measuring unit 520 may provide data to a control system and an operator 540 associated with the control system. The operator 540 associated with the control system may interact with TV editors and producers 550 to provide a contour map of the terrain 560 to overlay with a broadcast of the image of the terrain.

The communication between the operator control computer unit and the drone's control unit 1110 may use the Bluetooth technology. Bluetooth radio frequencies may include the band of 2400.0 MHz-2483.5 MHz.

Adaptive scanning techniques may be used to maximize the number of data points during the scanning process. The mapping of the terrain may utilize the maximum number of data points possible in both vertical and horizontal directions, and then resolution may be left for decisions by editors/producers to control the desired resolution for the displayed TV picture, for example. After the data has been collected, the operator or the TV production crew may determine the level of resolution that is required for a specific TV image. The resolution is achieved by controlling the number of displayed data points utilized to plot the terrain map. The collected data points may be sorted as per distance measured in order to achieve the desired resolution level. When the selected data is plotted, the plot may be superimposed on the live picture showing a player putting on the green. This view may illustrate to the home viewer why the golf ball may not be traveling in a straight path during a player's putt. After the distance measuring unit completes a scan of the field of view, the system 1100 may automatically adjust the setting of the firing angle for the laser light prior to the scanning of a new field of image. At the end of every scanned field, the collected data containing terrain distance measurements may be formatted by the operator control computer after which it may be forwarded to the TV production crew for further processing.

Once a full field has been scanned, the data may be transmitted to the control unit 1110. If any violations are present (drone rotation, drone height from terrain), alarms may be generated. Once an alarm command is released, the received data may be cleared and deleted. Thus, data from the distance measuring unit may be processed if no alarms have been detected during the field of view mapping.

Once the scanning of the terrain has been completed the operator or the TV producer/editor may manipulate the data to create a family of contour lines by sequentially highlighting equal distance points where equal data points represent a dedicated contour line. The utilization of the collected data may allow the control system to create an image similar to a topographical map of the field of view. The system has the ability to transmit the collected distance measurements to the TV editor/producers in order for them to select and determine the level of mapping resolution that they want to show the home viewer. The detail structure of each contour line may have an adaptive format. In addition, the TV producer/editor may request an increase or decrease (adaptive format) the width of the contour lines in order to increase or decrease the resolution of each line, for example: distance a, distance b and distance c are part of contour line 1 or distance a is equal to contour line 1, distance b is equal to contour line 2 and distance c is equal to contour line 3. The detail structure of each contour line may vary as per TV producer/editor request.

The distance measuring unit may process the collected data and report the collected data to the control unit or to the TV producer/editor for further processing. Each distance measuring unit may process the collected data (look for measurements violations) and report the finding to the control unit. The control unit may generate an alarm if the horizontal and vertical detection unit reported movements during the field of view mapping.

After the distance measuring unit completes the field of view scanning, the system may refresh the starting scanning angles for the distance measuring unit, in addition the field of view may also be receptive to changes as requested by the operator. The system may start scanning at the upper left hand corner and end at the bottom right hand corner of the outlined field of view. The transmitted data from the unit may be in the form of STUVWXYZ, where S=Device Identification, XXXYY; T=Start Firing angle X direction, degrees; U=End Firing angle X direction, degrees; V=Start Firing angle Y direction, degrees; W=End Firing angle Y direction, degrees; X=Firing angle step in X direction, degrees; Y=Firing angle step in Y direction, degrees; and Z=Measured distance, inches.

For example, a data transmit structure for one distance measured reading may be: XXXYY, 2, 110, 20, 75, 1, 1,110). The first measured data point for this scan may indicate the following:

S=Device Identification, XXXYY;
T=Start Firing angle X direction, degrees . . . 2;
U=End Firing angle X direction, degrees . . . 110;
V=Start Firing angle Y direction, degrees . . . 20;
W=End Firing angle Y direction, degrees . . . 75;
X=Firing angle step in X direction, degrees . . . 1;
Y=Firing angle step in Y direction, degrees . . . 1; and
Z=Measured distance, inches 110.

The total number of data points for the above field of (U−T)×(W−V)=108×55=5940.

The sub-assembly required for the overall operation of the system may contain device identification (ID). The ID may be utilized to confirm operation and presence within the control unit network. The ID may be automatically assigned by the control unit. The structure of the ID may be part letters and part numbers as follows: Device Identification=XXXYY, where XXX may be letters from A to Z and YY may be digits from 1 to 99. It should be noted that other identification schemes may be used without departing from the general features described above.

The control unit 1110 may receive inputs from the operator and calculate the total field of view dimensions. The field of view may take into account the operator inputs regarding the field of view physical size and may allow additional area for a guard band.

A system starting point may be that of a distance of 30 feet in the y direction and a distance of 20 feet in the x direction, which is a total of 600 square feet. The field of view for each unit may be determined by the control unit. The control unit may determine the drone height from which to scan in order to cover the specified field of view. The control unit may calculate the height from which to scan the field of view based on the square footage of the view.

The firing angle for the distance measuring device may be dictated by the control unit 1110. The firing angle may be based on the tilt and the rotation of the drone as reported by the horizontal and vertical angular detection unit. The information may be sent to the control unit 1110 for calculating the details for the distance measuring device so that full coverage of the field of view is achieved. The control unit 1110 may provide the following to each of the distance measuring devices:

S=Device Identification, XXXYY;
T=Start Firing angle X direction, degrees;
U=End Firing angle X direction, degrees;
V=Start Firing angle Y direction, degrees;
W=End Firing angle Y direction, degrees;
X=Firing angle step in X direction, degrees;
Y=Firing angle step in Y direction, degrees; and
Z=Measured distance, inches.

If requested or required, the system 1100 may increase or decrease the step size between firing angles in order to increase or decrease the resolution of the field of view.

Once all of the subassemblies of the drone system 1100 have been secured, a power command may be sent by the operator by initiating a start button on the operator control unit 1110, which in turn may issue a power up command to the remaining subassemblies. Each of the subassemblies may have an ID, thus assuring that only the control unit 1110 may be allowed to communicate with the subassemblies. Assurance of a successful powering sequence by each of the subassemblies may be sent to the control unit 1110. During the power up sequence, the control unit 1110 may collect data from control unit 1110 as it relates to battery status, (e.g., amount of battery power remaining).

After assuring that all subassemblies are secured, the control unit 1110 may poll all of the subassemblies and confirm that radio frequency (RF) communication and data transfer is properly working between any subassembly and the control unit 1110. The control unit 1110 may send commands to the drone control unit instructing it to confirm the scanning area. Upon receiving the data, the control unit 1110 may evaluate it to check targeted versus actual view area. If the actual view is not within the targeted range, the control unit 1110 may be reset and the start-up operations may have to be re-run. The control unit located on the drone may re-adjust the scan area to take into account new coordinate values. Reset and start-up may be repeated until the actual area view is close to the targeted area value. The alarm unit may be activated to confirm functionality.

After the power up sequence has been completed, the control unit 1110 may initiate a system initialization routine for each subassembly. Upon confirmation that each associated subassembly is powered and communicating, the control unit 1110 may issue a self-calibrate command (e.g., establish height from terrain, id of distance measuring device and field of view). Once all of the subassemblies operation has been confirmed, they may be polled and each may be automatically identified. The control unit 1110 may communicate with each of the subassemblies secured to the drone so that data communication, battery status, and unit orientation are reported to the operator control system. In addition, alarm warning limits may be entered into the system during the initialization process.

As part of the initialization, the user may select the preference of the operation. The user may select either an automatic or user defined mode to define and monitor the field of view. If the automatic mode is selected then the distance measuring unit automatically determines the total field of view from a predetermined height above the terrain. The operator control system provides the control unit (on the drone) the maximum operational height above the terrain. If the user selects the operational distance, the control unit 1110 may monitor the control unit for best coordinate values, field of view, coverage area and the starting scanning firing angle. Confirmation of field of view area may be performed prior to the start of scanning.

After all of the subassemblies have been secured to the drone, the operator may instruct the drone to rise at a height of 10 feet and scan a portion of the terrain for a system calibration and to be assured that all of the assemblies are properly working. The operator may define a small field of view and may then activate the mapping process. Once all of the measurements have been received, the control unit 1110 may determine whether all of the measurements performed by the assembly are within a selected accuracy tolerance. The user may be asked to enter the unit of measurement for the reporting of data, (e.g., feet or meters).

After all of the subassemblies of system 1000 have powered up, each may go through a self-calibration cycle. During this calibration cycle, each subassembly may be tested for functionality, two way radio frequency (RF) transmission, battery status, and alarm generation. Once the self-calibration cycle has been completed, the operator of the control system may be asked to position the drone at a known height from the terrain. The drone distance measuring devices may go through a sequence of measurements for assuring that the defined height above the terrain is confirmed. During this stage, Pythagorean calculations may be performed to assure the correct positioning of the distance measuring devices on the user.

The system may utilize Pythagorean calculations for extracting: vertical distances to terrain while the drone is stationary and area of the outlined perimeter. As a result of this calibration, the field of view may be determined and modified to meet the operator and TV editor/producers view terrain criteria. The control unit 1110 may calculate and inform the appropriate field of view to the distance measuring unit.

Alarm detection and informing may be exercised while acknowledgement from the user may be confirmed. The drone camera may be utilized to work in conjunction with the manual operation of the distance measuring units to highlight each of the four corners. Once all of the corners have been identified, the system 1000 calculates the best fit length and width so that the marker defined area can be mapped. The total area to be mapped can also be determined by direct entry of length and width. The firing angles for the distance measuring units may cover an area that exceeds the requested perimeter. The control unit may calculate the firing angles for all distance measuring devices for both vertical and horizontal positions, as dictated by the drone position above the terrain to be mapped.

Since the system 1000 may utilize multiple distances measuring units, the total field of view may be divided amongst them as determined by the control unit 1110. The system 1000 may calculate and inform the firing angle to every distance measuring unit every time the system is started, or anytime the drone position changes from the previous scan. The scanning directions may be controlled and the distance measuring laser may be instructed to scan from left to right or right to left. After each horizontal scan, the system 1000 may automatically increase or decrease the vertical firing angle until it has completed the requested field of view. If the drone moves or rotates, the system 1000 may recognize the new position and make all of the required corrections and calculations so that the new field of view reflects the horizontal and vertical position of the drone new orientation. In addition, the system 1000 may not retain the data and alternatively start a new scan once the new position and height above the terrain has been confirmed. For the distance measuring units in each of the control units secured on the drone, the system 1000 may split the coverage for each device so that each one covers half of the total field of view.

The control system may be able to interpret data received from each of the distance measuring units used to measure the distance from the drone to the terrain. When the control system determines that the field of view has been scanned, the received data may be evaluated (determine the minimum and maximum distance) so that topographical maps may be created between the maximum and minimum distances that have been recorded in the mapped field of view. Once these values have been obtained the creating of a map can be started from either the minimum or maximum distance points values. The system may truncate the measured distance amount from all of the data points by subtracting a common value from each of the measurements. From the collected data the total slope may be determined and construction of layers with each having a different distance measurement may be achieved. The system may decipher the collected data and determine the number of maximum layers associated with the mapped terrain. The total number of layers may be identified by creating of topographical maps. A color for layer identification may be selected and each layer may be identified by a different shade of the selected color.

The complexity of the system 1000 cannot rely on the entering of exact coordinates to define the field of view but it does need an operator to identify the basic field of view. The field of view may be identified by utilizing the drone's video camera and then direct a distance measuring unit laser light to mark each of the four corners. Upon selecting and marking the four corners, the system 1000 may define the best fit set of coordinates to outline the wanted field of view. Once the scanning of the field of view has been completed, the data may be forwarded to the editors/producers for conditioning before it is superimposed on a live picture. Since the step selection for either the vertical or horizontal sweep is selectable, it may be advantageous to scan utilizing the smallest step angle which in turn provides the highest resolution. The small step angle provides added data points which increase the level of resolution for when added focusing is required. To have collected distance measurements data and having the ability to have it available to the TV production crew to either increase or decrease the level of resolution of the terrain as per live TV transmission demand may be referred to as adaptive mapping.

The measuring of height above the terrain needed to map a specific terrain requires that the system is fully operational and that the functionality of limit settings, field of view, horizontal and vertical firing angle limits may be determined with the aid of the drone camera rather than by an operator direct entry. The system may construct the field of view by determining the physical dimensions of the terrain area plus an additional area for an added guard band.

In order to minimize user intervention, the system 1000 may operate in semi-automatic mode. Upon completion of securing the devices to the drone and having confirmed that all of the subsystem operations are faultless, the control unit 1110 may inform the user that the running of the system 1000 is semi-automatic (i.e., there are some direct entries that need to be made once the drone is airborne and before the mapping process is started).

The start scanning command for all of the distance measuring devices may be controlled by the local computer operator or remotely by editors in the TV production room. Prior to the drone being airborne, the control unit 1110 may be updated with system parameters as provided by the operator. Once the drone is airborne and the control operator has determined a start location, the drone video camera and the distance measuring units may be utilized to exactly determine the field of view, drone's orientation and position above the terrain. The control unit 1110 may constantly update the field of view as it receives inputs from the distance measuring units by providing direct length and width dimensions and camera picture for added confirmation. The mapping command may be given to the control unit 1110 once the field of view has been confirmed by any of the operators. An added feature that may be utilized for determining the field of view is that of placing markers (cones) at each corner of the wanted field of view. The operator may then confirm each of the corner location by utilizing the drone's camera for specific selection and then manually directing the control unit distance measuring laser beam to record the selected cone's coordinate and distance, this process may be repeated until all of the cones locations have been identified and recorded. The operator control system may take the provided coordinates and may create a best fit shape for the field of view to be mapped. Once the field of view is created the beams firing angles may be determined for all of the distance measuring devices. Mapping can be started once the operator command is initiated.

Once the field of view is determined, the control unit 1110 may inform each of the distance measuring units their respective field of view. Once the distance measuring units receive the field of view updates and confirmation from the control unit 1110, each distance measuring unit may complete the mapping cycle (collect distance measuring data) and update the mapping tables to reflect the latest received data. The mapping data must be completed before a new distance measuring cycle can be started.

The system may require some manual entries initiated by an operator. The operator may be asked to power the control unit and confirm that correct steps are taken as the system is calibrated. Manual entries may be required, but their number may be kept at a minimum.

The operator may be able to choose the method by which alarms may be informed. Alarms may be transmitted to the user utilizing audio tones. The system 1000 may generate alarms when the drone's rotation and its height above the terrain have changed from the set level and whenever the control unit 1110 or distance measuring modules are not responding.

In one embodiment, a computer-implemented method for the creation of an adaptive mapping may be implemented to show terrain details as the ball travels from the player's putter towards the hole on the green. The drone may contain a plurality of distance measuring subassemblies. The tilt and rotation of the drone may be monitored using the horizontal and vertical detection unit on the drone. Based at least in part on the tilt and rotation of the drone, vertical and horizontal firing angles used by a distance measuring unit in each of the subassemblies may be calculated to transmit and receive laser signals to perform measurements. Field of view instructions and alarms may be provided to the operator based on whether the drone's rotation or altitude has changed from the previously generated field of view.

Field of view dimensions, depth of field distance and laser firing angle limits may be determined for each of the distance measuring units. An initialization procedure may be performed by instructing the operator to change the location (physical and height) of the drone with respect to the terrain while each of the distance measuring units transmits and receives laser signals at different vertical and horizontal firing angles to perform measurements.

One of the subassemblies of the drone may serve as a control unit to communicate with all of the other subassemblies. The control unit 1110 may calculate a total field of view to be scanned based on data provided by the alternate distance measuring unit. The control unit 1110 may calculate the field of view dimensions for each of the distance measuring units. A horizontal and vertical angular detection unit located in the alternate distance measuring unit may be used to determine tilt and rotation movements of the drone. The control unit 1110 may calculate the vertical and horizontal start firing angles based on inputs from the horizontal and vertical detection unit.

In one embodiment, a computer-implemented method for the creation of an adaptive terrain map may be implemented to show terrain details as the ball travels from the player's putter towards the hole on the green. Field of view dimensions, depth of field distance and laser firing angle limits may be determined for a distance measuring unit in each of the subassemblies. Each of the distance measuring units may transmit and receive laser signals at different vertical and horizontal firing angles to perform measurements. Navigation instructions and alarms may be provided to the operator based on whether the drone's rotation or altitude has changed from when the field of view was determined.

In another embodiment, a computer-implemented method for the creation of an adaptive mapping system may be implemented to show terrain details as the ball travels from the player's putter towards the hole on the green. Each of the subassemblies may comprise a distance measuring unit comprising of a laser unit configured to transmit and receive laser signals to perform measurements. A control unit may be configured to communicate with each of the subassemblies and provide navigation instructions and alarms to the operator based on whether the drone's rotation or altitude has changed from when the field of view was determined.

In another embodiment, a non-transitory computer-readable storage medium may contain a set of instructions for a computer-implemented method for the creation of an adaptive mapping system may be implemented to show terrain details as the ball travels from the player's putter towards the hole on the green. At least one of the instructions may be used for calculating, based at least in part on tilt and rotation of a drone's position, vertical and horizontal start firing angles used by a plurality of distance measuring units to transmit and receive laser signals to perform measurements.

At least another one of the instructions may be used for providing navigation instructions and alarms to the operator based on whether the drone has moved during the actual mapping process or that one of the sub-assemblies is not operational.

What is claimed is:

1. A computer-implemented method of providing narrow-band terrain mapping, the method comprising:
    determining an area to be mapped within a field of view of a stationary aerial platform;
    selecting a plurality of firing angles of a laser on the stationary aerial platform to scan the dimensions of the terrain in the selected area to provide desired resolution in the mapping;
    stationary scanning the selected area using the selected plurality of firing angles to fulfill narrow-band terrain mapping within the selected area; and
    monitoring the stationary aerial platform position and rotation during the stationary scanning to ensure stability.

2. The method of claim 1 further comprising updating field of view to compensate for any change in measurement position.

3. The method of claim 1 further comprising providing collected data of perimeter outline.

4. The method of claim 1 further comprising performing an initialization procedure.

5. The method of claim 1 wherein the firing angles are selected for the firing of a laser in a raster scan of the area.

6. The method of claim 1 wherein the monitoring includes monitoring position of a stationary aerial platform to ensure the platform remains stationary.

7. The method of claim 6 wherein the stationary aerial platform houses a laser that fires based on the firing angles.

8. The method of claim 7 wherein a control unit controls the stationary aerial platform and monitors its position.

9. The method of claim 7 wherein the control unit controls the laser.

10. The method of claim 1 wherein the field of view is determined using at least one terrain marker.

11. The method of claim 1 wherein the field of view is determined using a set of at least four terrain markers.

12. The method of claim 1 further comprising overlaying the mapping of the terrain over an image of the terrain presented to a viewer.

13. The method of claim 12 wherein the overlayed image provides details of the undulations of the terrain.

14. The method of claim 13 wherein the undulations are not visible from the image alone.

15. A system for rendering terrain on a display, the system comprising:
    a computer-implemented distance measuring system integrated in a stationary aerial platform to enable stationary, narrow-band scanning of the terrain, wherein the stationary aerial platform is equipped to:
    determine an area to be mapped within a field of view of the stationary aerial platform;
    select a plurality of firing angles of a laser on the stationary aerial platform to scan the dimensions of the terrain in the selected area to provide desired resolution in the mapping;
    stationary scan the selected area using the selected plurality of firing angles to fulfill narrow-band terrain mapping within the selected area; and
    monitor the stationary aerial platform position and rotation during stationary scanning to ensure stability.

16. The system of claim 15 wherein a control unit controls the stationary aerial platform and monitors its position.

17. The system of claim 15 wherein the field of view is determined using at least one terrain marker.

18. The system of claim 15 wherein the stationary scanning is performed from a system selected height.

19. The system of claim 15 wherein the levels of the terrain are rendered using variable line widths of a single color that are superimposed over an image of the terrain.

* * * * *